(12) United States Patent
Dorson et al.

(10) Patent No.: US 11,892,192 B1
(45) Date of Patent: Feb. 6, 2024

(54) AIR CONDITIONING SYSTEM WITH MULTIPLE ENERGY STORAGE SUB-SYSTEMS

(71) Applicant: Transaera, Inc., Somerville, MA (US)

(72) Inventors: Matthew H. Dorson, Somerville, MA (US); Ross Bonner, Salem, MA (US); Sorin Grama, Boston, MA (US); Alexander MacFarlane, Somerville, MA (US)

(73) Assignee: Transaera, Inc., Somerville, MA (US)

( * ) Notice: Subject to any disclaimer, the term of this patent is extended or adjusted under 35 U.S.C. 154(b) by 359 days.

(21) Appl. No.: 17/001,607

(22) Filed: Aug. 24, 2020

Related U.S. Application Data

(60) Provisional application No. 62/890,590, filed on Aug. 22, 2019.

(51) Int. Cl.
*B01D 53/26* (2006.01)
*F24F 3/14* (2006.01)
(Continued)

(52) U.S. Cl.
CPC ........ *F24F 3/1411* (2013.01); *B01D 53/0438* (2013.01); *B01D 53/0454* (2013.01);
(Continued)

(58) Field of Classification Search
CPC ... F24F 3/1411; B01D 53/0438; B01D 53/04; B01D 53/0454; B01D 53/261; B01D 2253/34; B01D 2257/80; B33Y 80/00
(Continued)

(56) References Cited

U.S. PATENT DOCUMENTS

| | | | |
|---|---|---|---|
| 3,448,561 A | * | 6/1969 | Chesterfield ....... B01D 53/0407 95/122 |
| 4,182,412 A | | 1/1980 | Shum |

(Continued)

FOREIGN PATENT DOCUMENTS

| | | |
|---|---|---|
| CN | 102506475 A | 6/2012 |
| CN | 214305404 U | 9/2021 |

(Continued)

OTHER PUBLICATIONS

Overbey, Daniel, Internet Document "Defining Humidity Ratio and Relative Humidity," retrieved from https://www.buildingenclosureonline.com/blogs/14-the-be-blog/post/87509-defining-humidity-ratio-and-relative-humidity; published Apr. 2018.*

(Continued)

*Primary Examiner* — Frank M Lawrence, Jr.
(74) *Attorney, Agent, or Firm* — Wolf, Greenfield & Sacks, P.C.

(57) ABSTRACT

A system and method for separating humidity control from temperature control and utilizing multiple energy storage sub-systems to reduce overall energy consumption, and more generally to cool and dehumidify ambient air using such a multitude of energy storage mediums, including electricity, water, moisture and thermal storage The system uses a primary cooling sub-system such as a vapor compressor in combination with one or more energy storage sub-systems to store energy during one period of operation for later use during another period of operation based on an algorithm that determines the most cost efficient or energy efficient usage.

4 Claims, 16 Drawing Sheets

(51) Int. Cl.
*B01D 53/04* (2006.01)
*B33Y 80/00* (2015.01)

(52) U.S. Cl.
CPC ............ *B01D 53/261* (2013.01); *B33Y 80/00* (2014.12); *B01D 2253/34* (2013.01); *B01D 2257/80* (2013.01)

(58) Field of Classification Search
USPC ..................... 96/111; 95/117, 121, 10, 122
See application file for complete search history.

(56) References Cited

U.S. PATENT DOCUMENTS

| | | | |
|---|---|---|---|
| 4,527,398 A * | 7/1985 | Schaetzle | F24F 5/0046 95/207 |
| 4,552,570 A * | 11/1985 | Gravatt | G01N 27/225 95/122 |
| 4,664,182 A | 5/1987 | Miwa | |
| 5,298,231 A * | 3/1994 | Rockenfeller | B01D 53/34 95/137 |
| 6,226,888 B1 * | 5/2001 | Lang | B01D 53/261 96/144 |
| 6,311,511 B1 * | 11/2001 | Maeda | F24F 5/001 62/271 |
| 6,318,106 B1 | 11/2001 | Maeda | |
| 6,904,962 B2 | 6/2005 | Reinders | |
| 6,951,242 B1 | 10/2005 | Des Champs et al. | |
| 7,730,736 B2 | 6/2010 | Matsui et al. | |
| 7,841,194 B2 | 11/2010 | Ishida et al. | |
| 7,997,098 B2 | 8/2011 | Yabu et al. | |
| 9,074,522 B2 | 7/2015 | Scholt et al. | |
| 9,146,040 B2 | 9/2015 | DeValve | |
| 9,255,744 B2 | 2/2016 | Huizing | |
| 9,475,476 B1 * | 10/2016 | Wright | B01D 53/0454 |
| 9,855,595 B2 | 1/2018 | Michel et al. | |
| 10,254,049 B2 | 4/2019 | Mittelbach et al. | |
| 10,589,220 B1 * | 3/2020 | DiMaiolo | B01D 53/047 |
| 11,255,616 B2 | 2/2022 | Brockway et al. | |
| 11,619,437 B2 | 4/2023 | Bostic, Jr. et al. | |
| 2007/0193287 A1 | 8/2007 | Ishida et al. | |
| 2012/0031273 A1 * | 2/2012 | Heer | B60T 17/004 96/115 |
| 2013/0239814 A1 * | 9/2013 | Ito | F24F 3/1429 96/111 |
| 2015/0153051 A1 * | 6/2015 | Pahwa | F24F 11/63 96/111 |
| 2017/0321909 A1 | 11/2017 | Davies | |
| 2019/0178574 A1 * | 6/2019 | Naito | B01D 53/261 |
| 2019/0203958 A1 | 7/2019 | Wang et al. | |
| 2020/0232665 A1 | 7/2020 | Hirai et al. | |
| 2020/0355383 A1 * | 11/2020 | Stahelin | F25D 31/007 |
| 2023/0022397 A1 | 1/2023 | Maeda et al. | |

FOREIGN PATENT DOCUMENTS

| | | |
|---|---|---|
| CN | 217898889 U | 11/2022 |
| EP | 1 804 005 A1 | 7/2007 |
| EP | 3 054 224 A1 | 8/2016 |
| JP | 2013-190177 A | 9/2013 |
| WO | WO 2009/057323 A1 | 5/2009 |
| WO | WO 2019/089971 A1 | 5/2019 |
| WO | WO 2021/200072 A1 | 10/2021 |

OTHER PUBLICATIONS

Cui et al., Metal-Organic Frameworks as advanced moisture sorbents for energy-efficient high temperature cooling. Sci Rep. Oct. 1, 20186;8(1):15284. doi: 10.1038/s41598-018-33704-4.

Jeremias et al., Advancement of sorption-based heat transformation by a metal coating of highly-stable, hydrophilic aluminium fumarate Mof. Rsc Adv. May 1, 20143;4(46):24073-82.

Metrane et al., Water Vapor Adsorption by Porous Materials: From Chemistry to Practical Applications. J Chem Eng Data. Jun. 2, 20227;67(7):1617-53.

Tu et al., Comfortable, high-efficiency heat pump with desiccant-coated, water-sorbing heat exchangers. Sci Rep. Jan. 1, 20172;7:40437. doi: 10.1038/srep40437.

Rieth et al., Tunable Metal-Organic Frameworks Enable High-Efficiency Cascaded Adsorption Heat Pumps. JACS. Nov. 2, 20181;140(50): 17591-6. Supporting Information.

Zu et al., Performance comparison between metal-organic framework (MOFs) and conventional desiccants (silica gel, zeolite) for a novel high temperature cooling system. IOP Conf Series Mater Sci Eng. 2019;609(5):052013.

* cited by examiner

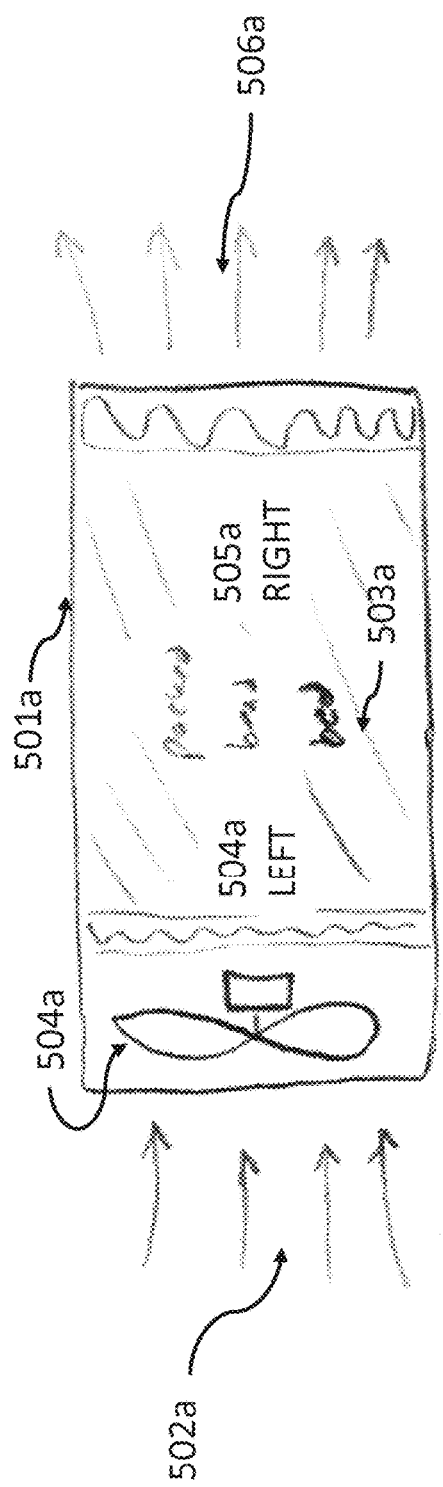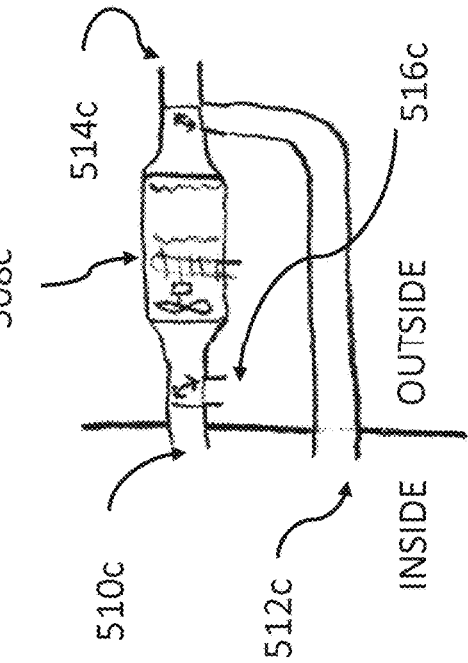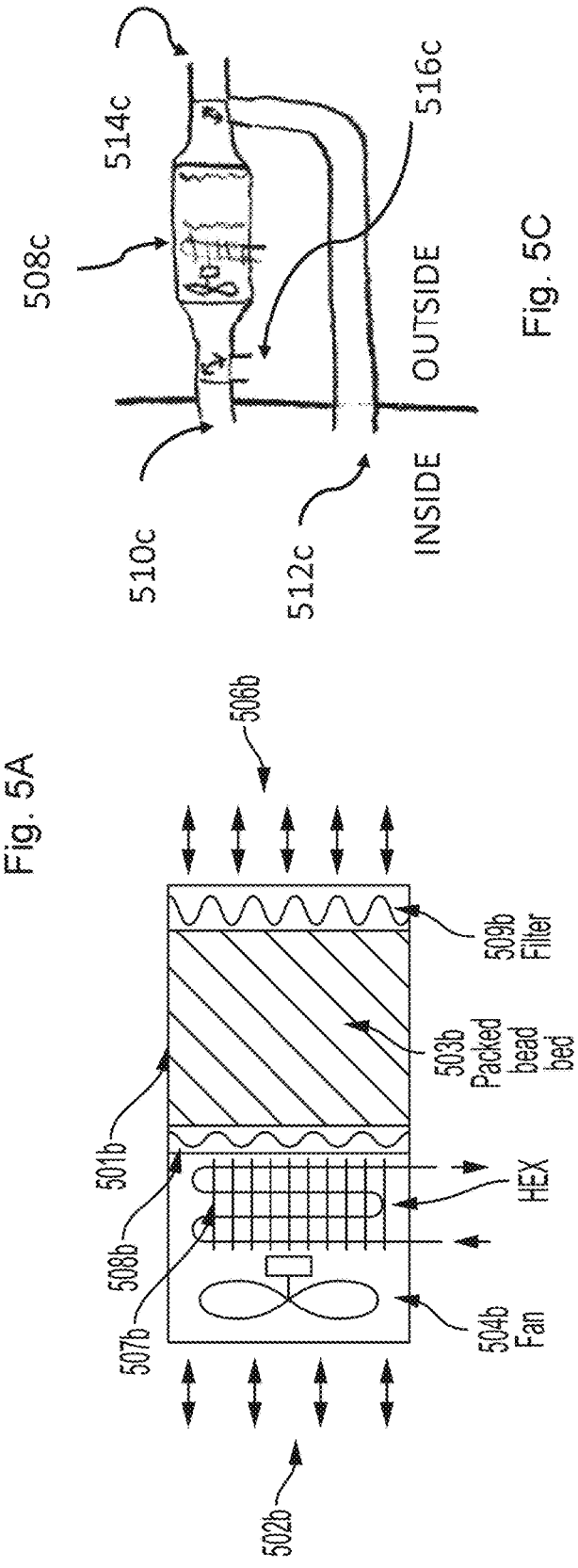
Fig. 5A
Fig. 5C
Fig. 5B

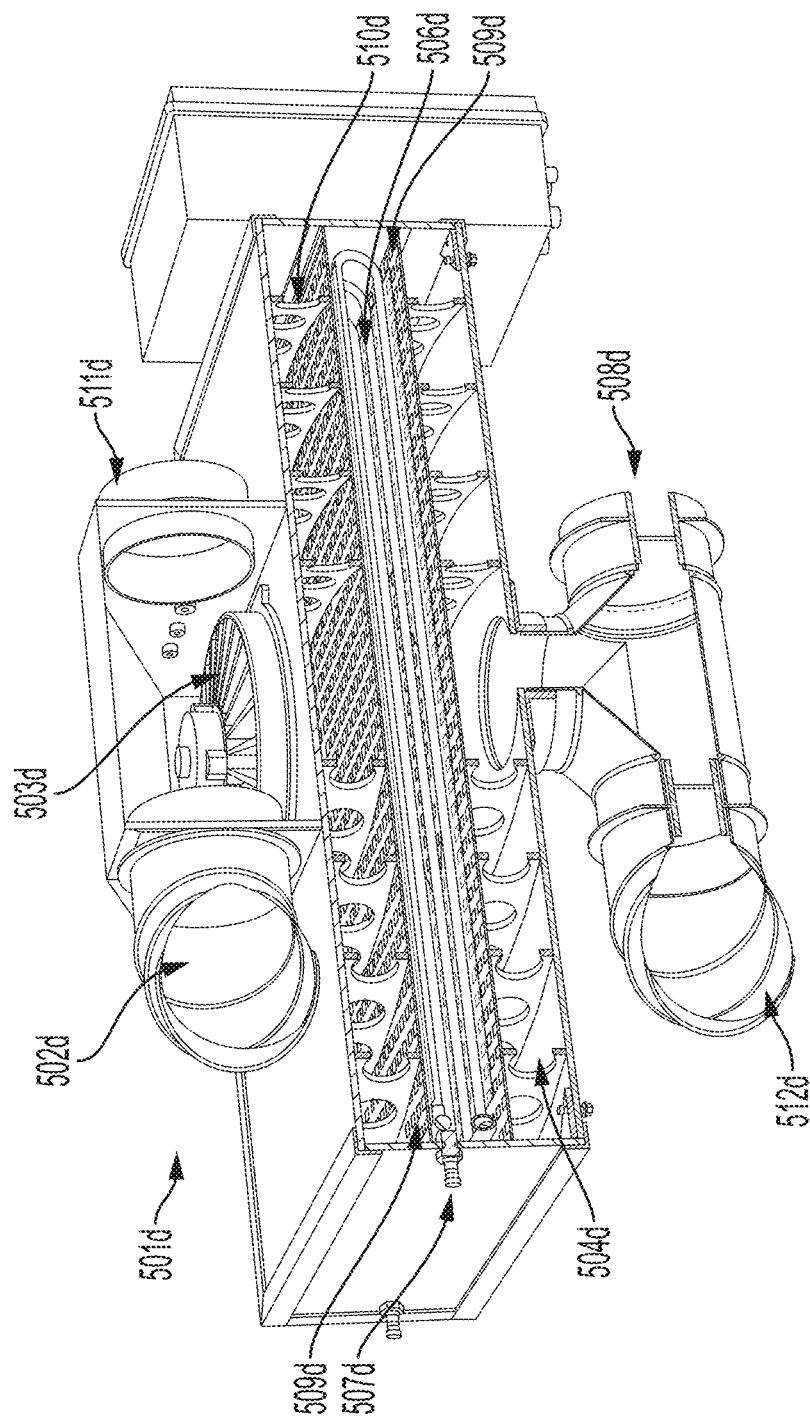

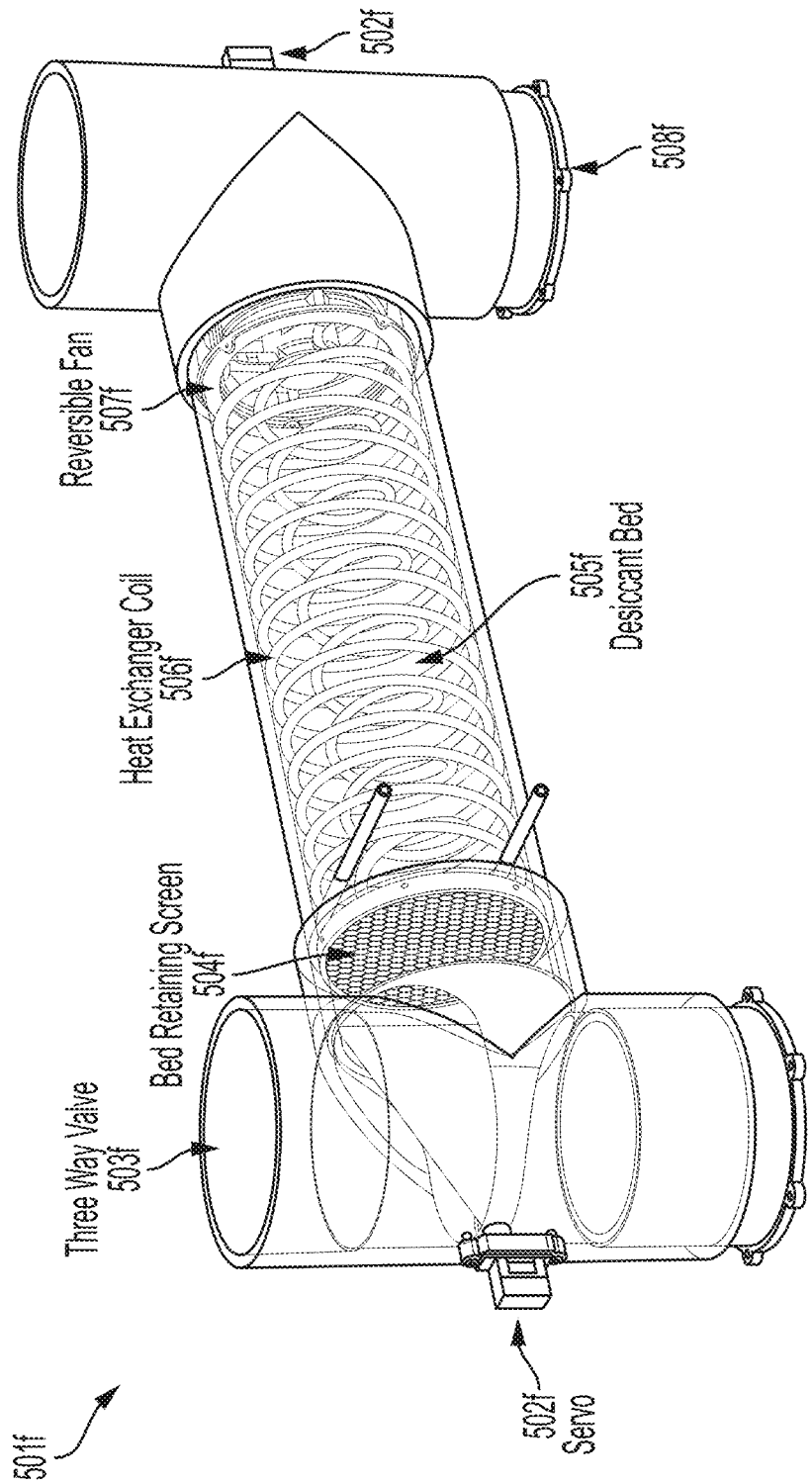

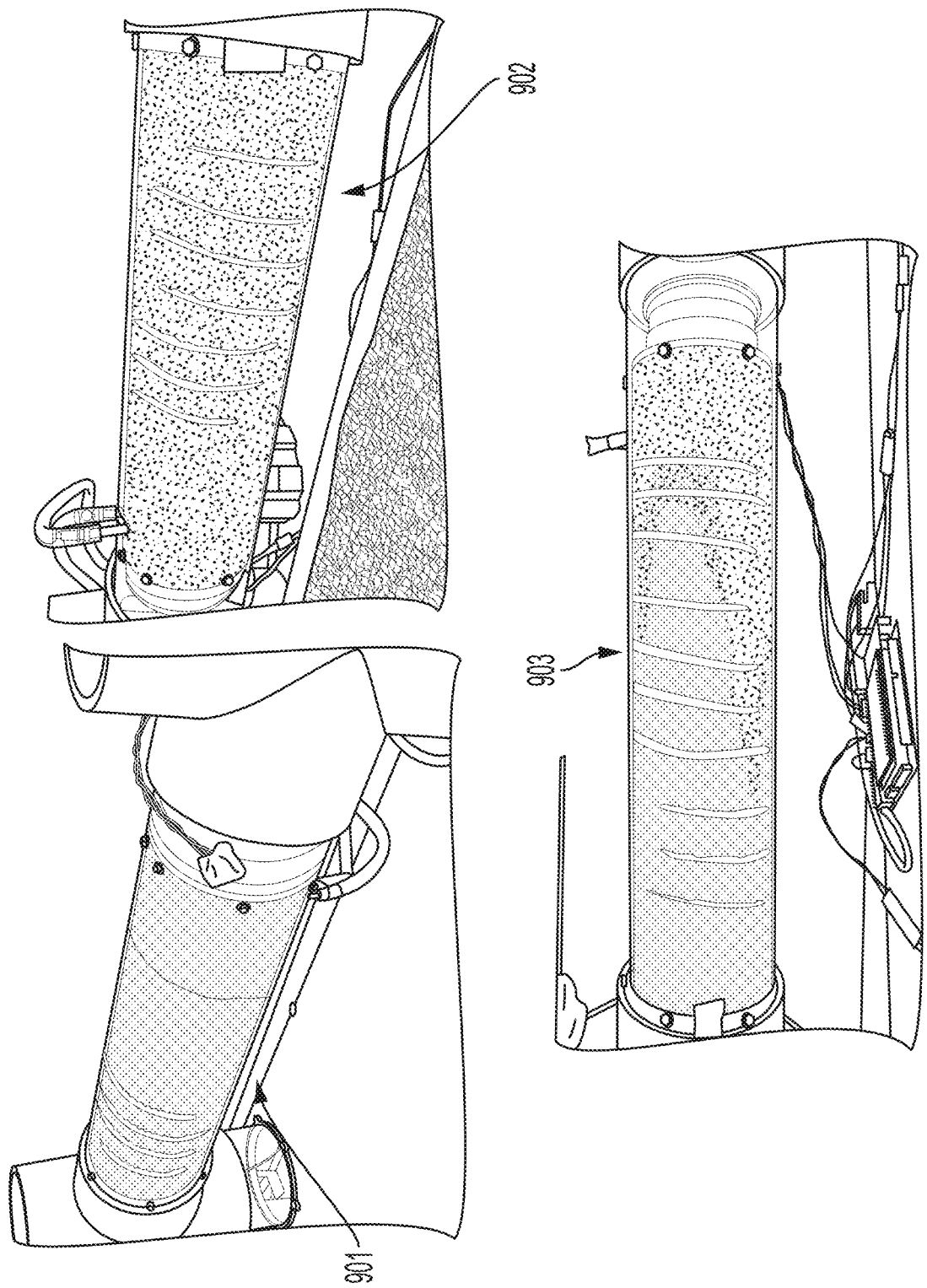

AIR CONDITIONING SYSTEM WITH MULTIPLE ENERGY STORAGE SUB-SYSTEMS

RELATED APPLICATION

This application claims the benefit of U.S. Provisional Application Ser. No. 62/890,590, filed Aug. 22, 2019, entitled AIR CONDITIONING SYSTEM WITH MULTIPLE ENERGY STORAGE SUB-SYSTEMS, the entire disclosure of which is herein incorporated by reference.

STATEMENT REGARDING FEDERALLY SPONSORED RESEARCH OR DEVELOPMENT

This invention was made with U.S. government support under Grant Number 1819345, awarded by the National Science Foundation. The U.S. government may have certain rights in this invention.

FIELD OF THE INVENTION

This invention relates to air conditioning systems and more particularly to systems that employ multiple modalities to perform the air conditioning function.

BACKGROUND OF THE INVENTION

Air temperature is commonly used an indicator of thermal comfort. However, humidity is as important as temperature in determining thermal comfort. High humidity environments prevent the evaporation of sweat from skin resulting in thermal discomfort. High humidity in buildings and homes can also lead to molds and bacterial diseases that affect our health. Controlling humidity levels is a key aspect of heating, ventilation and air conditioning (HVAC) systems. Yet humidity control is usually done as an afterthought, a by-product of cooling the air which often leads to highly inefficient solutions. To control humidity levels, HVAC systems typically over-cool the air to remove moisture and then reheat the air to achieve temperature targets, resulting in an effective double penalty on energy efficiency.

An extreme example of this is in vertical farming, a fast-growing segment of indoor farming that represent an increasingly important sector of the overall food chain. Vertical farms are sealed structures or buildings where plants are grown with 100% artificial lights. Lights generate heat while plants naturally produce significant moisture through evaporation and photosynthesis. The heat (e.g., air temperature 102) is removed with a standard HVAC system and humidity levels are kept in check as long as the lights and the cooling system are on. However, when the lights go off (e.g., HVAC Input Power 103), the HVAC system turns off, and humidity levels 101 increase dramatically (FIG. 1). Another example is in residential buildings where air conditioners are also relied upon to perform both the cooling and dehumidifying functions at the same time. However, studies of temperature and humidity characteristics in residential buildings show that peaks of humidity and temperatures levels do not coincide throughout the day. FIG. 2 shows a plot of latent heat load 202 (proportional to humidity) and sensible heat load 201 (proportional to temperature) in a typical home over a period of 3 days. Latent heat loads are highest in the mornings and evenings while sensible heat loads are highest during the day.

A better, more energy-efficient approach would be to separate the cooling and dehumidifying functions and performing each function only when needed.

SUMMARY OF THE INVENTION

This invention overcomes the disadvantages of the prior art by separating humidity control from temperature control and utilizing multiple energy storage sub-systems to reduce overall energy consumption, and more generally to cool and dehumidify ambient air using such a multitude of energy storage mediums, including electricity, water, moisture and thermal storage The system uses a primary cooling sub-system such as a vapor compressor in combination with one or more energy storage sub-systems to store energy during one period of operation for later use during another period of operation based on an algorithm that determines the most cost efficient or energy efficient usage. In an exemplary arrangement, the energy storage sub-systems comprise of one or more of the following:
  (a) a moisture storage sub-system that captures and stores water vapor from air,
  (b) an electrical storage sub-system that captures and stores energy from the primary electrical power source or a secondary electrical power source or other electricity generating devices that may be present,
  (c) a thermal storage sub-system that captures and stores thermal energy from ambient or other components of the system,
  (d) a water storage sub-system that captures and stores liquid water from water sources such as a water system or other components of the system that generate water, and
  (e) a secondary electrical power generation sub-system such as grid, solar or wind power generation.

Illustratively, the operation of the system is orchestrated a by control sub-system that determines the best use of any combination of the available sub-systems at any time based on a set of input conditions that require optimization for cost, energy use or other factors important to end users.

One aspect of the disclosure provides a heat exchanger, comprising: a pipe configured to carry a fluid; a plurality of heat exchange surfaces; and a desiccant media arranged in the within a volume defined by the heat exchange surface at a predetermined packing density to allow for heat transfer between fluid and desiccant media and to allow moisture transfer between gas and desiccant media.

In one example, the plurality of heat exchange surfaces comprises one or more coils of wire.

In one example, the pipe has a cross-sectional shape of one a circle, oval, square, or rectangle.

In one example, the desiccant media comprises a plurality of beads.

In one example, at least some of the plurality of beads are in direct contact with the plurality of heat exchange surfaces.

In one example, the plurality of heat exchange surfaces are arranged radially with respect to the pipe.

Another aspect of the disclosure provides a method of using a moisture storage device, comprising: charging the moisture storage device until a humidity ratio measured at an outlet decreases to meet a first predetermined humidity ratio threshold; discharging the moisture device until the humidity ratio at the outlet increases to meet a second predetermined humidity ratio threshold.

In one example, charging the moisture storage device comprises flow air having a first relative humidity over a desiccant media such that the desiccant media adsorbs moisture.

In one example, discharging the moisture storage device comprises flow air having a second relative humidity over a desiccant media such that the desiccant media desorbs moisture.

Another aspect of the disclosure provides a method of using a moisture storage device, comprising: a) providing a gas to a moisture storage device, the gas having a first relative humidity and a first temperature; b) charging the moisture storage device with the gas via an adsorptive process, thereby generating a heat of adsorption; c) during the charging of b), flowing a liquid at an ambient wet bulb temperature through a heat exchanger of the moisture storage device; d) expelling the gas from the moisture storage device at a second relative humidity and a second temperature, the second relative humidity being lower than the first relative humidity.

Another aspect of the disclosure provides a moisture storage device, comprising: an inlet port configured to pass a flow of gas therethrough at a first relative humidity; an outlet port configured to pass the flow of gas therethrough at a second relative humidity lower than the first relative humidity; and desiccant media configured to absorb moisture from the flow of gas during a charging cycle and configured to desorb moisture during a discharge cycle.

In one example, the device includes a heat exchanger in direct contact with the desiccant media.

In one example, the device includes a controller configured to transition the moisture storage device from a charging cycle to a discharging cycle based upon a moisture state of charge.

In one example, a rate absorbing or desorbing moisture by the desiccant media is determined in part by an equilibrium relative humidity associated with the desiccant media.

Note that in this exemplary arrangement air is a representative gas employed herein to transfer heat and/or moisture. However, in alternate arrangements it is expressly contemplated than any appropriate gas can be employed.

BRIEF DESCRIPTION OF THE DRAWINGS

The invention description below refers to the accompanying drawings, of which:

FIG. 5A is diagram of an exemplary moisture storage battery according to an aspect of the disclosure;

FIG. 5B is a diagram of an exemplary moisture storage battery according to an aspect of the disclosure;

FIG. 5C is a diagram of an exemplary moisture storage battery according to an aspect of the disclosure;

FIG. 5E is a perspective view of the exemplary moisture storage battery of FIG. 5D;

FIG. 5F is a perspective view of an exemplary moisture storage battery according to an aspect of the disclosure;

FIG. 9 is a depiction of a visual indicator of the moisture battery state of charge, shown in three discrete views, comprising full, empty and partially full;

DETAILED DESCRIPTION

The overall system is comprised of multiple, modular sub-systems that each have a defined input, output and a control interface. The inputs and outputs are compatible with each other such that the output of one module can be connected to the input of another module. This modular design allows for energy storage sub-systems or modules to be added or removed as needed to meet a cost or energy efficiency target. A control sub-system keeps track of what storage sub-systems are available and uses optimization algorithms to take advantage of the available sub-systems.

Figure 1:
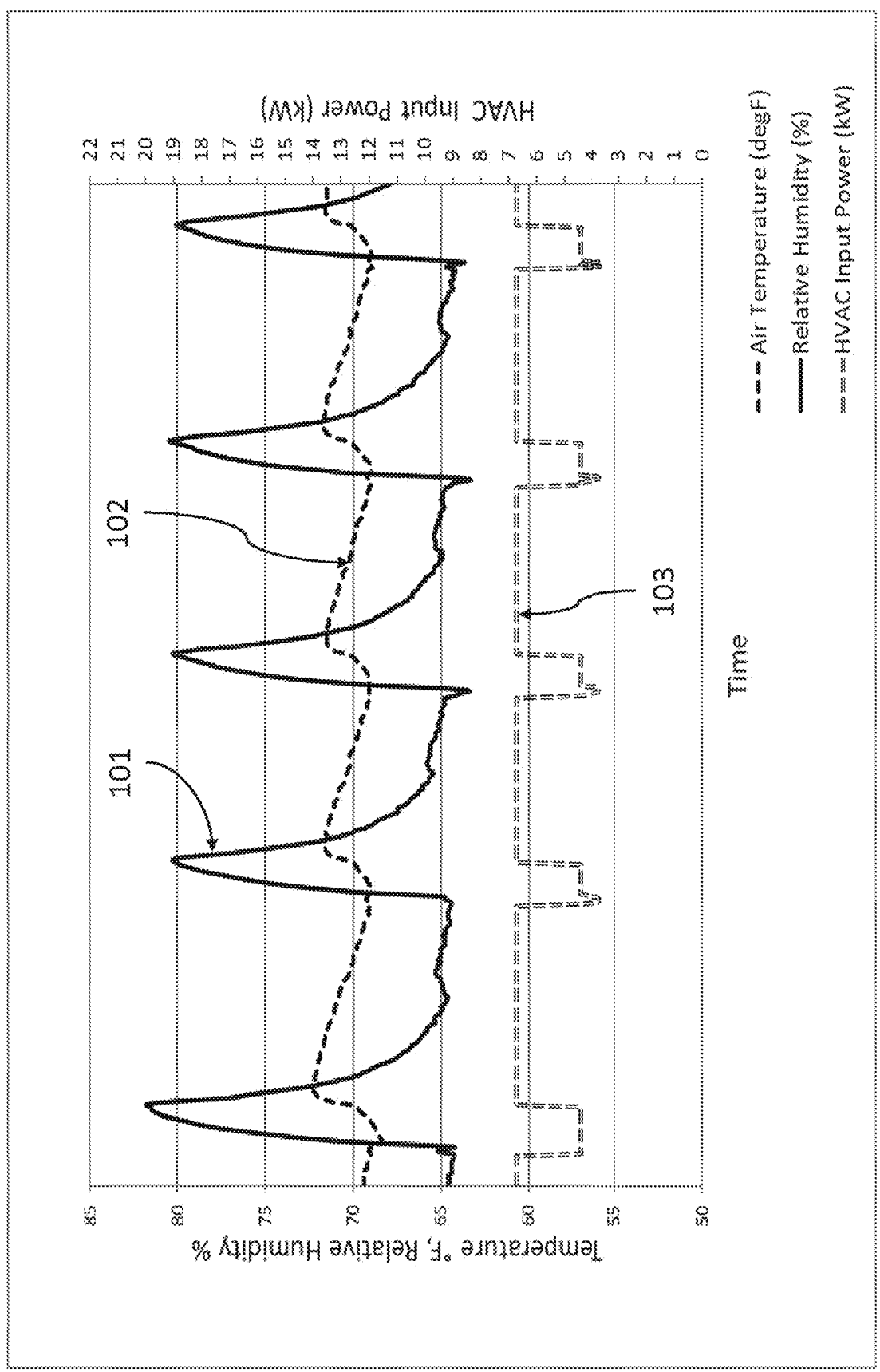
FIG. 1, already described, is a chart showing ineffective control of humidity levels when using standard HVAC equipment.
Figure 2:
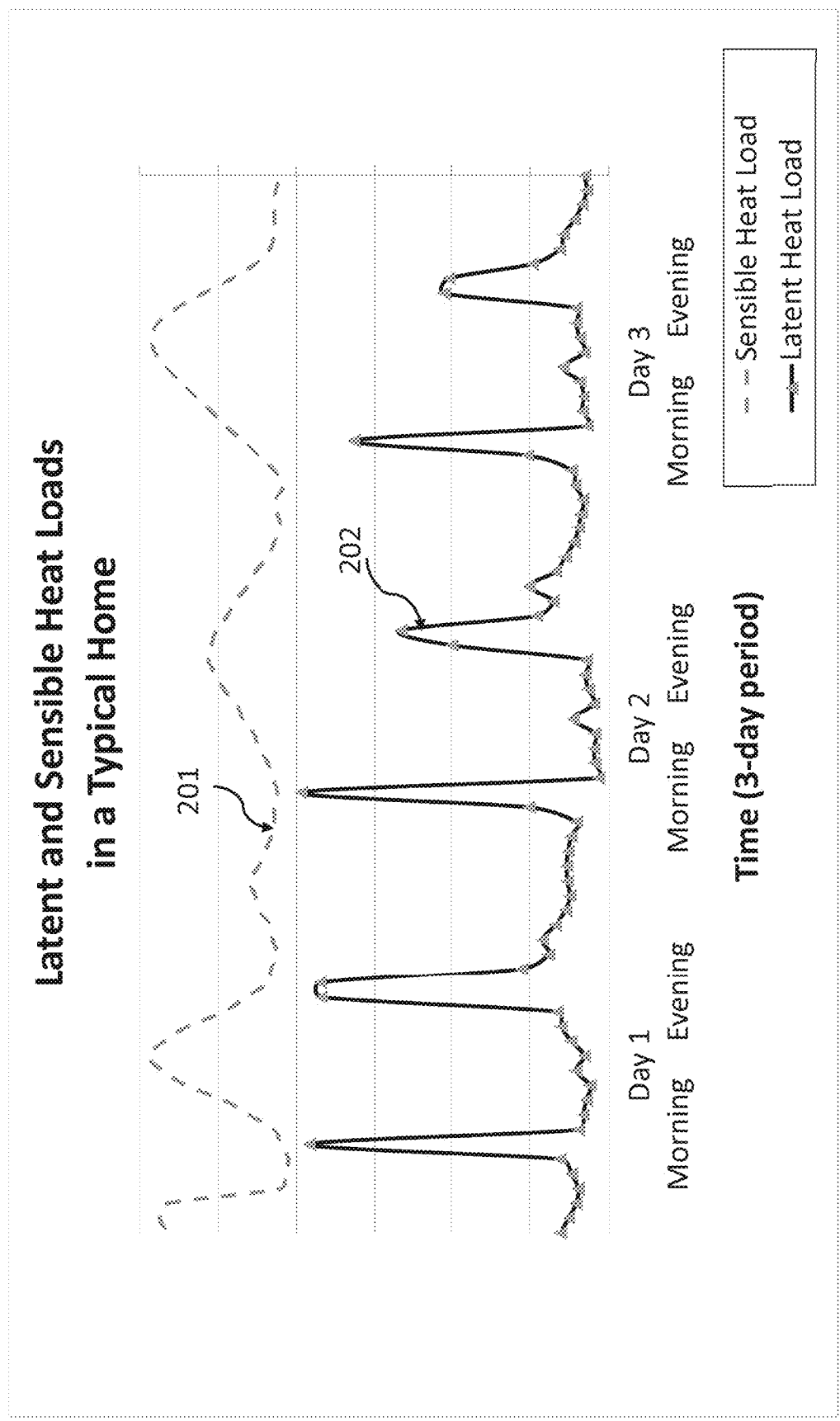
FIG. 2, already described, is a chart showing peaks of humidity (latent heat) and temperature (sensible heat) in a typical home.
Figure 3:
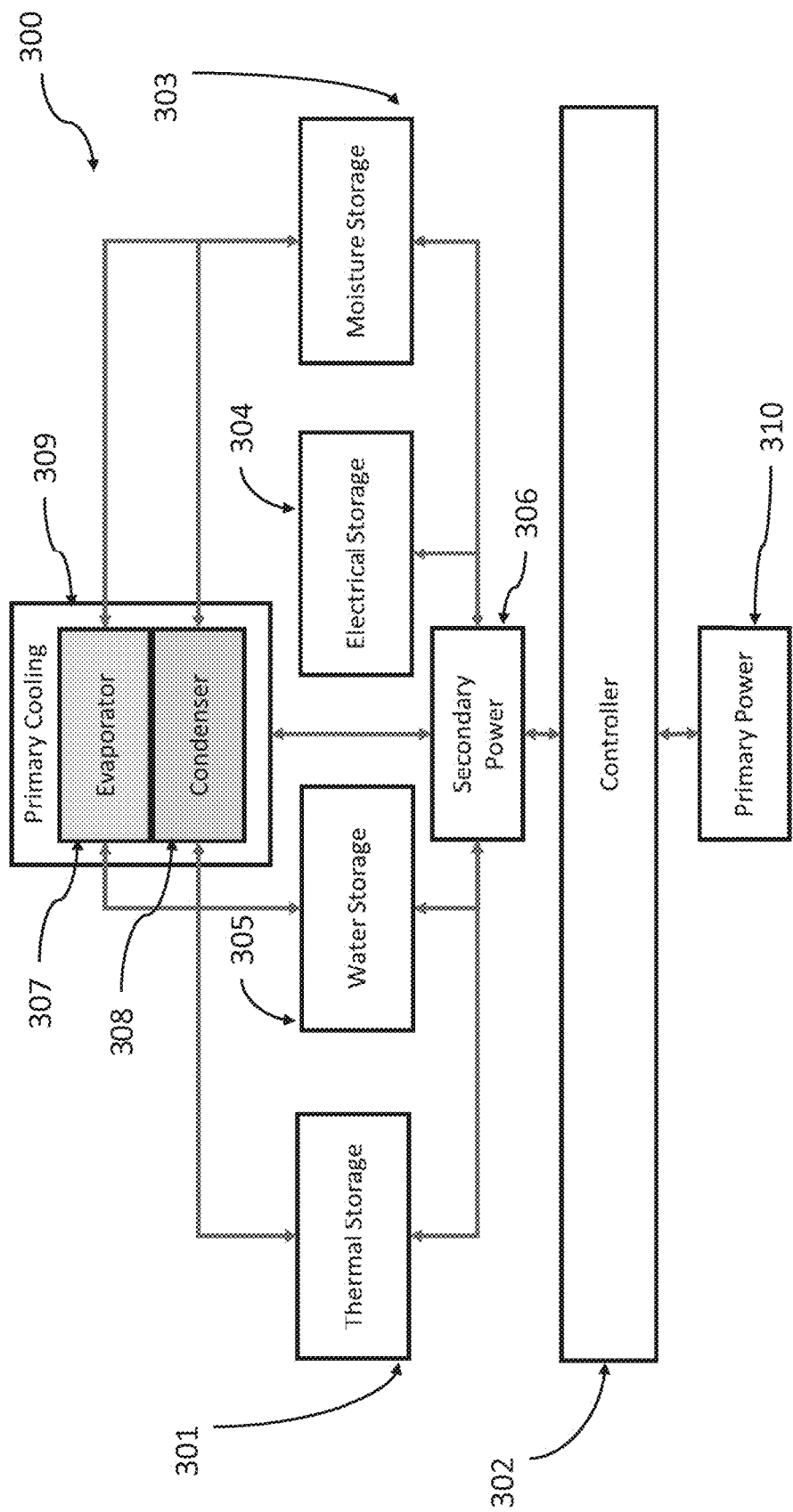
FIG. 3 is a block diagram of a system according to an exemplary embodiment.

FIG. 3 is a block diagram of a power system 300 system according to an exemplary embodiment. As shown, the system 300 can include a primary cooling subsystem 309, which can include a condenser 308 and an evaporator 307. In some examples, the primary cooling subsystem 309 can be an HVAC unit or other type of heating and/or cooling system, such as an air conditioner, ductless mini-split system, central air, or any other type.

The system primary cooling subsystem 309 can be powered by secondary power source 306 and/or primary power source 310. For example, the primary power source 310 can be an electrical grid for a particular geographic area. The secondary power source 306 can be a secondary connection to the electrical grid or can be a source of renewable energy, such as a solar panel or solar panel array, wind turbine, or any other type of renewable energy. The secondary power 306 can be interconnected directly or indirectly to thermal storage module 301, water storage module 305, electrical storage module 304, moisture storage module 303, and/or primary cooling module 309 having evaporator 307 and condenser 308.

The system 300 can include a controller 302 interconnected to primary power source 310 and/or secondary power source 306. The controller 302 can be a general purpose computer including one or more processor(s) and memory or memories and can determine an electrical load (e.g., current) drawn by any of the subsystems 301, 303, 304, 305, 307, 308, and/or 309 from primary power 310 and/or secondary power 306 automatically adjusts the operation to use only the available modules or subsystems that are detected and actually connected to the controller 302. The primary cooling subsystem 309 can interconnect to one or more subsystems 301, 303, 304, and/or 305.

As described, the system can include thermal storage subsystem 301. In one example, the thermal storage subsystem 301 is a cooling water reservoir filled with encapsulants containing a phase-change material (PCM) tuned to capture the heat of adsorption released during moisture storage (e.g., by moisture storage subsystem 303) or solar thermal heat harvested from a solar PV panel or a solar thermal collectors (e.g., secondary power 306). In another example, the thermal storage subsystem 301 can include an insulated storage enclosure with the phase change material tuned for the temperature rise observed in the desiccant material (e.g., of moisture storage subsystem 303) during loading may be provided. In a typical application, this can be just a few degrees higher than the room temperature setting. The thermal storage subsystem 301 returns the stored heat to the adsorption bed (e.g., a bed of packed desiccant material, as described in the examples below) of the moisture storage subsystem 303 during discharge to reduce the need for waste heat regeneration. Stored heat can be adjusted using a suitable phase change material to minimize heat rise. This stored heat can then be augmented with solar power or vapor compressor waste heat to dry out the desiccant material. Alternatively, a solar thermal collector can be used to generate thermal energy for the same purpose.

In some examples, the thermal storage subsystem 301 may or may not be included in the system 300 depending on the particular application. For example, where heat energy, such as waste heat from another module or subsystem, is implemented, thermal storage subsystem 301 may not be implemented.

The system 300 can also include an electrical storage subsystem 304 comprising of an electrical battery connected to the primary power source 310, secondary power source 306, or any source of electricity. The battery stores electrical energy to be used later as directed by the controller 302. In one example, solar energy harvested during the day can be stored at electrical storage subsystem 304 and used later in the day or evening to reduce power consumption from the grid (e.g., primary power 310) such that the system 300 does exceeds a predetermined grid power consumption threshold.

The system 300 can also include a water storage subsystem 305 that can draw and stores water from an external plumbing system, water harvested from the moisture storage subsystem 303, or water harvested from rain by another subsystem (such as solar panel 410 using duct 411 as described below). The harvested water stored in tank 403b is used by to cool condenser 405 through the process of water evaporation.

In some examples, the subsystems (e.g., 301, 303 304, 305, and/or 309) are physically arranged such that energy transfers between modules is achieved in most efficient manner. For example, the moisture storage subsystem 303 may be located in proximity or embodied within the condenser 308 of the primary cooling subsystem 309 such that the heat from condenser 308 can be more effectively utilized during a charge or discharge cycle of moisture storage subsystem 303.

The system 300 can also include moisture storage subsystem 303 (also referred to as a "moisture storage device," "moisture storage battery" or "MSB") that captures water vapor from a gas (such as air) and releases the captured water vapor at a later time when it is more cost and energy efficient to do so. The moisture storage subsystem 303 can take advantage of differences in temperature and humidity between night and day or morning and afternoon. For example, the MSB can capture moisture from a room during morning hours when humidity levels tend to be higher and release that moisture later in the afternoon when humidity levels tend to be lower. The device can also be utilized to reduce peak humidity levels by capturing moisture for relatively brief periods of time such that the overall moisture levels in a room do not exceed a certain threshold.

Figure 4:
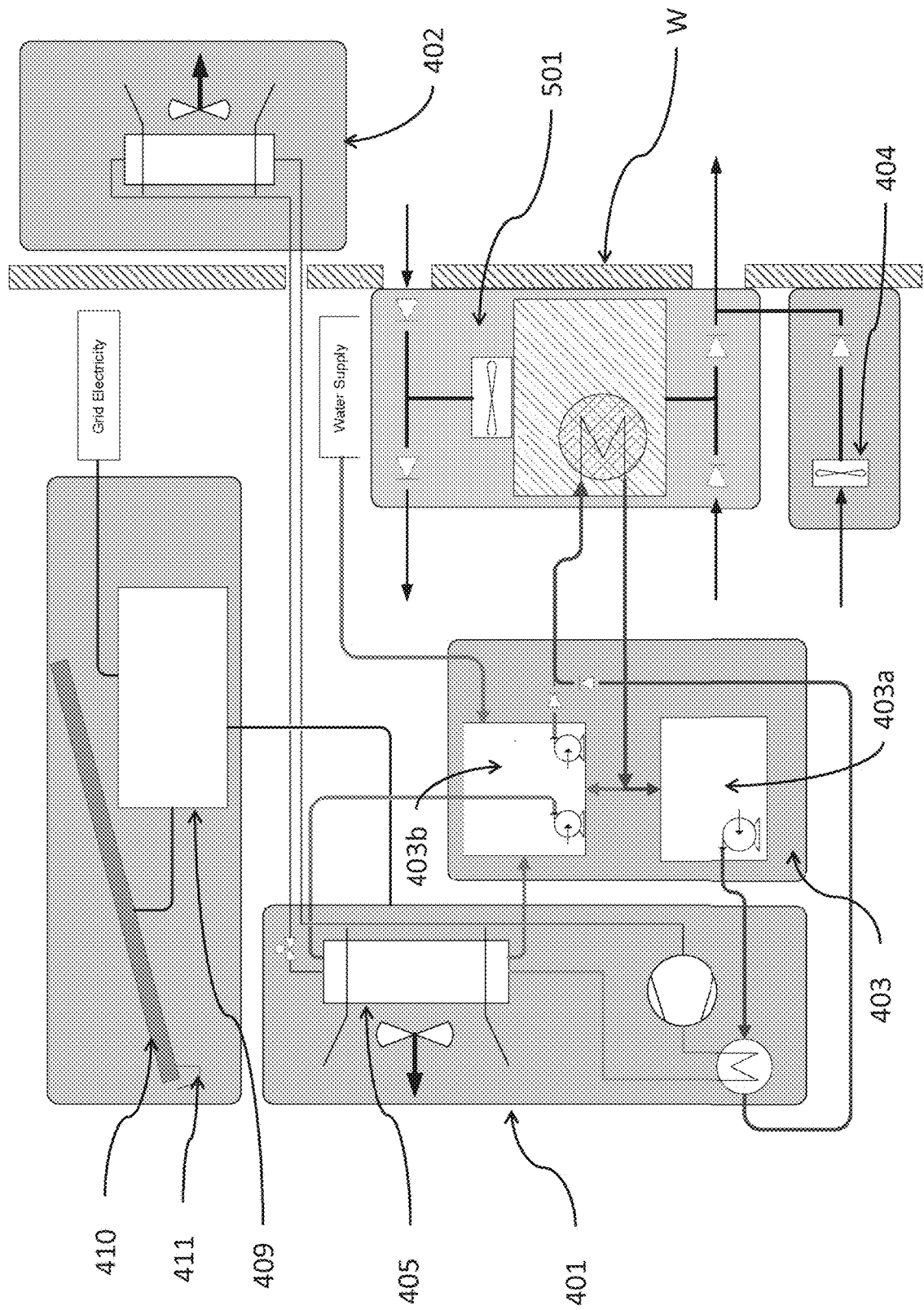
FIG. 4 is a detailed diagram of the system of FIG. 3, according to an exemplary embodiment.

FIG. 4 is a detailed diagram of the system of FIG. 3, according to an exemplary embodiment. As shown, the system 400 can include a primary cooling subsystem including condenser assembly 401 (e.g., condenser 308) and evaporator 402 (e.g., evaporator 307). In this example, the evaporator 402 can be located exterior to a wall W of a building and the condenser 401 can be located within the wall W of the building, but other configurations are contemplated depending on the system.

The system 400 can also include an electrical battery 409 (e.g., electrical storage 304) and one or more solar (photovoltaic) panel(s) 410 (e.g., secondary power 306). As described above, the solar panel 410 can also collect water via duct 411 for use in the moisture storage battery 501 (e.g., moisture storage subsystem 303). The condenser assembly 401 can include a condenser 405 and a water storage tank 403 (e.g., water storage subsystem 305) can include a hot water tank 403a and a cold water tank 403b. The system 400 can also include a fan 404 (e.g., bidirectional fan) that operates as part of a free-cooling subsystem that is enabled when the outside temperatures are lower than the inside target temperature that needs to be maintained. In this case, the primary cooling sub-system (e.g., 401 and 402) would not be operating, but the outside air can be utilized to cool the inside air using only circulating fan 404. Before discarding the outside air inside, the air may be filtered or otherwise conditioned with the moisture storage sub-system 501. Moisture storage subsystem is explained in greater detail below with reference to FIGS. 4 and 5.

The moisture storage battery 501 (e.g., moisture storage subsystem 303) is designed to capture moisture using a desiccant material such as a silica gel, alumina, zeolite or a metal-organic framework (MOF) material. The desiccant media comprising a plurality of desiccant structures can be 3D printed, based upon known techniques and equipment, using a composite material that consists of the active desiccant powder embedded within a rigid binding material such as a ceramic or plastic that does not affect the desiccant material's ability to adsorb moisture. The desiccant structure may be shaped into a rigid foam or frame-like structure with open space that permits a gas or air to flow efficiently and with minimal pressure drop. In another example, the desiccant structure may be shaped as a spherical or substantially spherical bead, an ovoid, ellipsoid, or any other type of three-dimensional shape. In this manner, the desiccant material embedded inside the desiccant structure adsorbs vapor moisture from the air.

The desiccant structure itself can perform the heat exchange operation without any additional heat exchanging elements. The material itself may be 3D printed such that fluid passages are allowed to exchange heat and thereby optimize the removal and supply of thermal energy to drive the adsorption and desorption process.

The desiccant material naturally adsorbs moisture during what is referred to as a "charging cycle" of the moisture storage battery. In the "discharge cycle" the moisture is released through desorption, a process during which the desiccant material goes through a drying phase, also called "regeneration". To achieve desiccant regeneration, waste heat from a vapor compressor system (e.g., primary cooling 309), solar collector (e.g., solar panel 410), or other sources of thermal energy can be used to regenerate the desiccant.

A key advantage of the approach of the present application over certain humidity control systems of the prior art, such as a desiccant wheel, is that the present application advantageously allows for storing moisture at the moisture storage battery until it can be released or utilized (e.g., selectively) later. Whereas a desiccant wheel adsorbs and desorbs moisture in real time while continuously rotating, the exemplary moisture storage battery device will absorb and store moisture for a period of time until it can be desorbed later with the most cost-effective source of heat, such as the condenser waste heat of the primary cooling sub-system. An analogue to this moisture storage battery is the electrical battery. An electrical battery stores electrical charge whereas the moisture storage battery stores moisture. In an electrical battery, storage capacity and rates of charge and discharge are predictable and relatively constant over a period of time. The moisture storage battery of the present application advantageously has predictable charge and discharge performance so it can be effectively incorporated into a larger system. Moisture capacity and the rates of moisture adsorption and desorption are repeatable and predictable. A moisture state-of-charge (MSOC) can be measured (directly or indirectly) or inferred (e.g., inferred from temperature rise across a bed of desiccant material during load or temperature fall during unload cycles) and predicted to indicate when the moisture battery is full or empty of moisture. Storing and removing moisture with this battery reduces the primary cooling sub-system load thereby downsizing the primary cooling sub-system or operating it at a more favorable coefficient of performance (COP).

Figure 5:
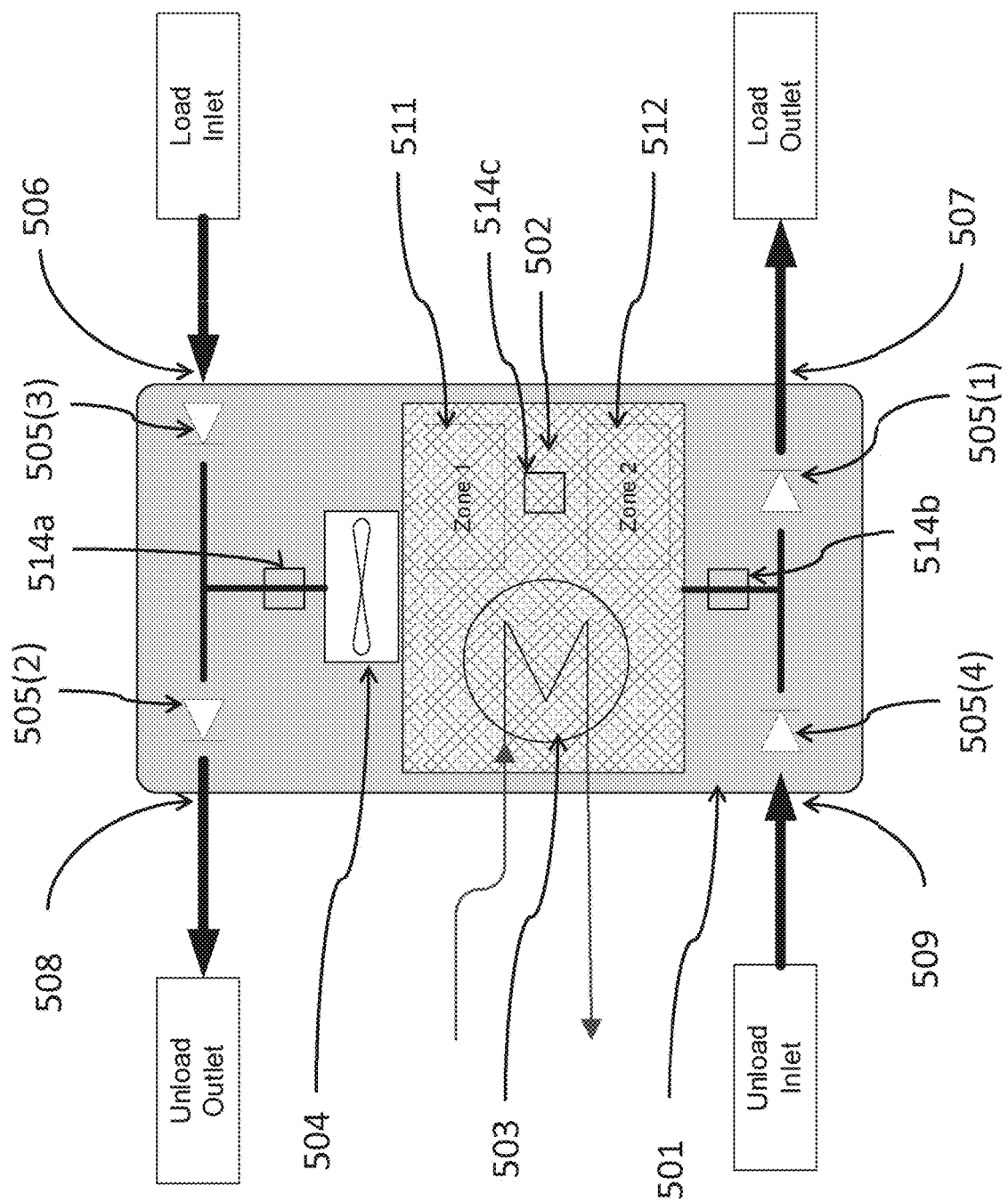
FIG. 5 is a diagram of a moisture storage battery for use in the system herein, according to an exemplary embodiment.

Referring now to FIGS. 4-5, a system 400 can include a moisture storage battery 501. Moisture storage battery module 501 can contains a desiccant material 502 which is cycled between an adsorption phase (e.g., charging or charging cycle) and a desorption phase (e.g. discharging, discharging cycle, or regeneration). During adsorption, moisture is captured inside the pores of desiccant material 502, in addition to being captured on the surface. Stated another way, the desiccant material can store the moisture. This process generates heat, called heat of adsorption. In one embodiment, the heat of adsorption generated by desiccant material 502 is removed via heat exchanger 503, at least a portion of which is in direct physical contact with desiccant material 502. Liquid (such as water, glycol, phase changing refrigerant material, or any other suitable heat transfer fluid) at colder temperature (e.g., lower than a temperature of desiccant material) roughly equal to outside dew point temperature is stored in water tank 403b and circulated through heat exchanger 503 to remove the heat of adsorption. When desiccant material 502 is saturated with moisture and no longer able to adsorb more moisture, moisture storage battery module 501 can switch to a desorption phase (either manually or automatically, e.g., by controller 302). During desorption, hot liquid (such as water, glycol, phase changing refrigerant material, or any other suitable heat transfer fluid) from hot water tank 403a is circulated through same heat exchanger 503 which transfers the heat to desiccant material 502. This supply of heat provides the desorption energy required to liberate the moisture from the desiccant material. In this manner, desiccant material 502 releases the stored moisture and is regenerated (prepared) for the next adsorption cycle.

While FIG. 5 depicts a moisture battery device having a heat exchanger (e.g., heat exchanger 503), other examples describe a moisture battery device without an embedded heat exchanger. In this configuration, the heat of adsorption can be stored in the bed of desiccant material downstream of the stored moisture and then used later to assist in the desorption of moisture from the same bed of desiccant material.

In the example of a moisture battery device 501 having an embedded heat changer, the moisture battery device 501 can include a fan 504, heat exchanger 503, desiccant material 502 and a plurality of check valves 505(1)-(4). Referring to FIG. 5, moisture battery 501 includes heat exchanger 503 in physical contact with a desiccant material 502 and a bi-directional fan 504. Fan 504 moves air (or another suitable gas) through a set of check valves 505(1)-(4). In the current embodiment, check valves 505(1)-(4) comprises four separate valves, while in other examples pairs of check valves can be connected to a common manifold. During charge (or moisture load) cycle, fan 504 rotates in a first direction and moves air from load inlet 506 to load outlet 507 via check valves 505(3) and 505(1) while valves 505(4) and 505(2) remain closed. In one configuration, the heat exchanger(s) are in close thermal contact with the desiccant material in the bed. It can also be arranged so that the heat exchanger is downstream of the bed during load or charging to capture the heat of adsorption released during loading. Reversing the fan puts it upstream of the bed during an unload cycle where it can provide the heat required for desorption of the moisture.

During discharge cycle, fan 504 rotates in a second direction (opposite direction relative to first direction during charge cycle) relative to the charge cycle and moves air from unload inlet 509 to unload outlet 508 via check valves 505(4) and 505(2) while valves 505(3) and 505(1) remain closed. Heat exchanger 503 removes or adds heat depending on the operation of the battery. During a discharge cycle, the heat exchanger 503 adds heat to desiccant media 502 to promote release of moisture. During a charge cycle the heat exchanger 503 may remove heat of adsorption by cooling desiccant media 502 to keep the desiccant media at a predetermined optimal temperature for adsorbing moisture. This optimal temperature can be determined, in part, based upon size of desiccant structures that form the desiccant media, shape of desiccant structures, packing density of desiccant structures, as well as additional factors. Bidirectional fan 504 enables air to flow in two directions depending whether the moisture battery is being charged or discharged.

During adsorption (charge cycle), desiccant media 502 will generate heat which will travel in the direction of air flow starting from zone 511 of the battery and ending in zone 512 of the battery. Reversing air flow with fan 504, the air will now flow from zone 512 to zone 511 thereby transporting the heat stored in zone 512 back to zone 511 where it regenerates the material thus allowing desiccant material 502 to begin another adsorption cycle. During loading and unloading desiccant material 502 will experience waves of heat traveling back and forth from zones 511 to 512.

While the example of FIG. 5 describes "air," it is understood that any suitable gas can be used during the charge and discharge cycles. For example, typical air in the atmosphere or in a home may include percentages of nitrogen, oxygen, and carbon dioxide, as well as other gaseous elements such as argon depending on the particular environment. In other examples, the suitable gas can include any combination of gaseous elements suitable for carrying water vapor, such as methane or carbon dioxide.

In the above-described example of a moisture battery device having an embedded heat changer, desiccant material 502 is inserted and embodied inside the moisture battery 501 in direct physical contact with heat exchanging element 503. Desiccant material 502 can be composed of self-contained, self-supported structures that permit air flow with minimal pressure drop such as beads or pellets. The desiccant structures could also be 3D printed foams coated with desiccant material, or desiccant coated foams or desiccant coated corrugated plastic coils. The heat exchanger is designed to provide optimal thermal contact with the desiccant material.

A control system (for example, controller 302 or a separate controller (not shown) including one or more processors and/or memory or memories) can be employed to control the operation of the moisture storage device 501.

For example, the control system can:
  control the adsorption, storage and desorption start, stop and duration;
  detect when moisture battery is full, partially full or empty using built-in sensors for temperature or humidity or by detecting color change;
  display status of the battery on a range from empty to full or from 0 to 100%; and/or
  using a predictive algorithm, predicts the state of the battery based on current state and predicted rates of adsorption and desorption.

During a load or unload cycle the rate of loading is dependent on the difference between the relative humidity (RH) of air flowing through moisture storage battery 501 and the equilibrium RH of the desiccant. The equilibrium RH is defined as the RH at which the desiccant and the air are in a state where no moisture transfer will occur from one to the other. The greater the difference between the air RH and the equilibrium RH, the greater the rate of loading or unloading. This rate of loading can be detected by monitoring the inlet air temperature and the temperature of the bed of desiccant material to determine an approximate "state of charge" of the moisture storage device. When the equilibrium RH of the desiccant is greater than that of the air, moisture will move from the air to the desiccant (loading) thereby reducing the RH of the air and increasing the moisture content of the desiccant. Similarly, when equilibrium RH of the desiccant is lower than that of the air, moisture will move from the desiccant to the air (unloading), thereby increasing the RH of the air and decreasing moisture content of the desiccant.

In one embodiment, primary condenser 405 is evaporatively cooled by direct flow of water from tank 403b over the condenser coils. Water may be applied to condenser 405 through a drip tray or bar at the top of the condenser and flow by gravity to a collector at the bottom, or it may be sprayed as a mist upstream of condenser 405 and drawn by the condenser fan through the condenser, with excess collecting on the coils and collected by gravity for recirculation. Use of an outdoor evaporative cooling tower can permit drying of indoor air and simultaneously cooling it near the outdoor wet bulb temperature. Since the heat of adsorption raises the indoor air temperature, this permits the combination to provide latent cooling in a wide range of climate conditions.

In one embodiment, a discrete evaporative cooling pad is placed upstream of condenser 405. Water from tank 403b flows over the cooling pad and cools the air to wet bulb temperature before flowing over the coils of condenser 405. Excess evaporative cooling water is collected and returned to tank 403b where may be recirculated to the evaporative cooler as needed.

As described above, a power system 300 can include a secondary power generation subsystem 306 that generates electrical and thermal power to be utilized by any of the storage sub-systems. The power generation sub-system supplements the primary power used by the primary cooling sub-system. In one embodiment, electrical power generation is accomplished with a solar photo-voltaic panel 410. The electrical energy is stored using an electrical battery 409. The same solar panel generates thermal energy by virtue of becoming hot due to sunlight exposure. This thermal energy can be used by the moisture sub-system 501 to regenerate the desiccant material 502. The same solar panel can collect water via duct 411. This water can be stored in tank 403b and to evaporatively cool primary condenser 405.

When moisture storage battery 501 is loading, initially the desiccant will be dry. Air enters at a first moisture content (e.g., a high moisture content such as between a range of 50-100% relative humidity) via port 506, transfers moisture to desiccant 502, and exits at a second moisture content (e.g., lower moisture content in the range of 20-60% relative humidity) via port 507. As the loading cycle proceeds, the desiccant moisture content increases and its equilibrium RH increases, reducing the rate of loading over time. Similarly, when the MSB is unloading, air with third (e.g., low moisture content in the range of 20-60%) moisture content enters via port 509, removes moisture from desiccant 502 and exits at a fourth (e.g., higher moisture content, e.g., in the range of 50-100%) humidity via port 508. As the unloading cycle proceeds, the desiccant moisture content decreases and its equilibrium RH decreases, reducing the rate of unloading over time. In one embodiment, temperature and/or relative humidity sensors 514a, b are placed at the inlet and outlet of moisture storage battery 501. The difference in inlet and outlet RH of the air is used to determine the state of charge of the moisture battery 501, which represents an amount of available moisture that can be expelled at a later time. A moisture state of charge can be determined by a controller (e.g., controller 302) such that the controller can automatically control operation and transition from a charge to discharge state. For example, the controller can operate a servo motor that can operate selectively open and close valves (as described in detail below) and can operate the fan 504 to achieve the desired state of charging or discharging. In another example, where the loading cycle is complete the moisture storage battery may not immediately progress to a discharging cycle. In this example, user input may begin the discharge cycle. In another example, a predetermined amount of time (selected by a user) may pass until the discharge cycle begins.

The difference in absolute moisture content of the air is calculated used to determine the moisture stage of charge (MSOC). When moisture storage battery 501 is loading, heat is released due to heat of adsorption. Similarly, when moisture storage battery 501 is unloading, supplied heat is absorbed due to heat of desorption. Temperature sensors are placed at the heat transfer fluid inlet and outlet of heat exchanger 503 to measure the input and output temperature of the heat transfer fluid. The difference in temperature between inlet and outlet is used to determine the Moisture State of Charge. A temperature difference in the heat transfer fluid can also be used to determine load or unload rates. In one example, temperature differences in the air stream with sensors 514a and 514b can be used to determine rates of load or unload and determine state of charge. In another example, a temperature and/or humidity sensor 514c can measure a temperature and/or relative humidity of a desiccant bed 503 during load and unload and during periods when the fan 504 is not running. This allows the system to determine cooling water should be run prior to loading in order to reduce heat addition to the room.

It is expressly contemplated that a plurality of (i.e. multiple) moisture batteries 501 can be coupled together to create moisture battery banks with increased moisture storage capability. Coupling is enabled via ports 506, 507, 508 and 509 such that multiple batteries can be connected in series or parallel. In a series arrangement, the load outlet of a first battery can be connected to the load inlet of a second battery and so on. Similarly, the unload outlet of a first battery can be connected to the unload inlet of a second battery. In a parallel arrangement, the respective ports 506, 507, 508, and 509 of each battery can be commonly connected, such as to a manifold or a header.

In the example of a moisture battery device without an embedded heat exchanger, as shown in FIGS. 5A-5C, the system does not use a heat exchanger in contact with the desiccant media. In this embodiment no external heat is added or removed with a heat exchanger. Instead the moisture battery device relies on its own stored internal heat to add heat to the desiccant media during the discharge cycle.

Referring to FIG. 5A, a moisture storage battery 501a can have a fan 504a that draws a flow of air 502a through a desiccant media 503a from a first (left) zone 504a to a second (right) zone 505a and ultimately out of moisture storage battery at 506a. In this regard, a portion of the desiccant media 503A (e.g., portion 504a or 505a) acts as a thermal storage while other stores moisture such that the moisture wave separates from the thermal wave. In this regard, the desiccant structure itself can perform the heat exchange operation without any additional heat exchanging elements. This arrangement uses the desiccant material, or another material to store thermal energy released during load in order to use it in the opposite direction during unload. The material used to store the thermal energy could be low cost solid media, liquid with high specific heat in some form of encapsulation or even phase change material in some form of encapsulation in order to optimize the thermal storage capability of that portion of the bed.

Referring to FIG. 5B, a moisture storage battery 501b can have a fan 504b that draws a flow of air 502b through a heat exchanger structure 507b that is separated from desiccant media 503b by an intermediate filler layer 508b, with a second filter later 509b located on another side of the desiccant media 503b. In this configuration, the heat exchanger 507b can remove heat during loading after the air passes through the desiccant bed. When the fan 504b reverses and the desiccant bed 503b in set to unload, the same heat exchanger 507b can supply heat in order to dry the incoming air and drive the desorption of moisture from the bed 503b.

FIG. 5C depicts an implementation in a practical application where inlet and outlet ports may be connected to a wall and air flow may be directed according to the operating mode of the battery 508c. During a loading or charging cycle, air can flow from 512c through a fan and desiccant bed and back to the room through 510c. During an unload or discharge cycle, air can flow from 516c through a fan and desiccant bed and out through 514c.

The device may have an intermediate section where moisture and heat are forced to separate. While moisture is retained in the desiccant, heat of adsorption can be: Extracted into a different material such as heat transfer fluid (e.g., FIG. 5); Retained in the adsorbent material (e.g., FIG. 5A); and/or Moved to a different location in the battery such as in the case when one portion of the moisture battery is adsorbing moisture while the other is desorbing moisture. The portion that is adsorbing moisture is generating heat of adsorption. This heat is transferred to the portion of the battery where desorption is (or will) occurring. In this manner, the heat of adsorption on one portion is used as a heat of desorption in another portion and therefore not wasted.

Figure 5D:
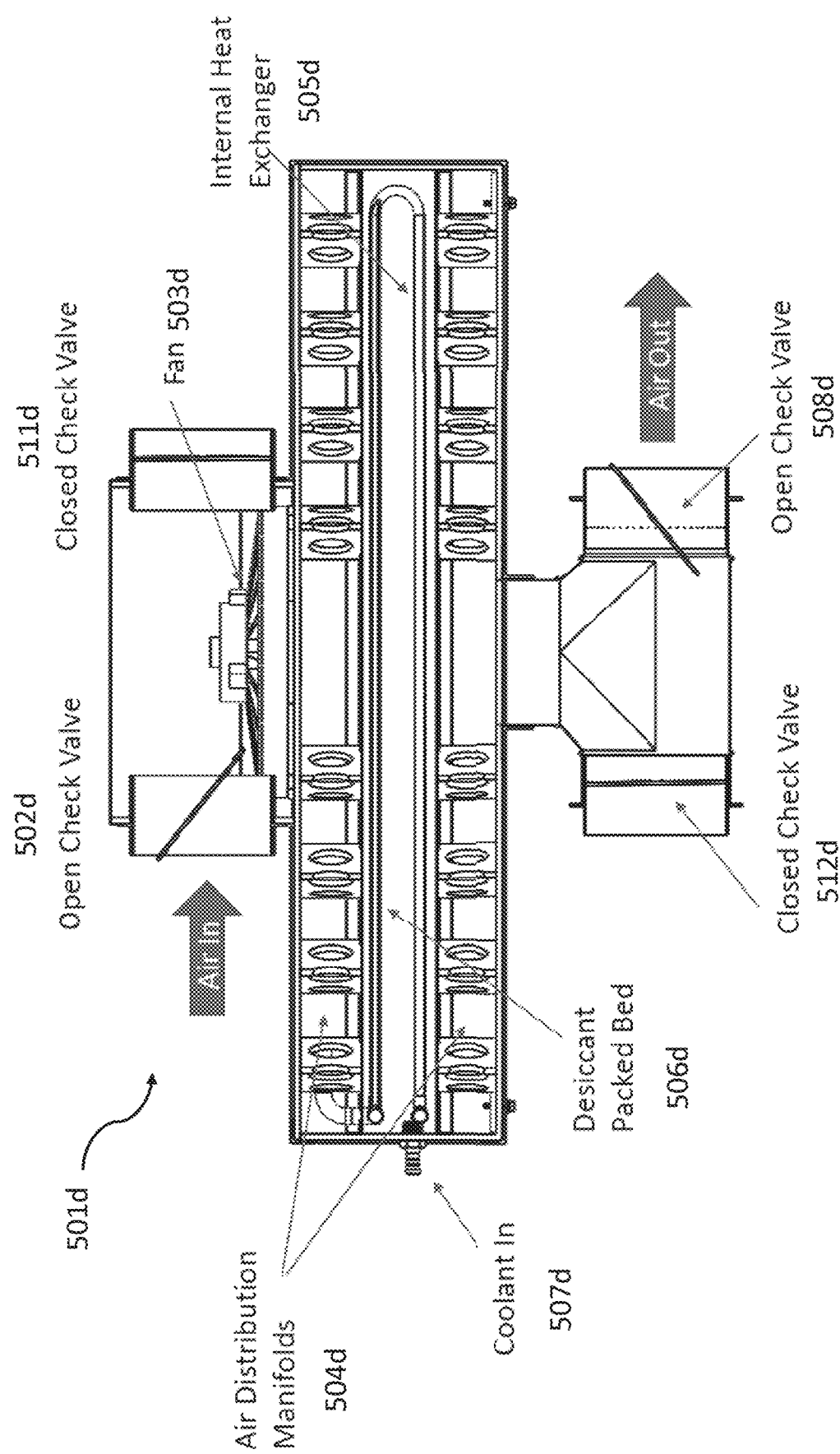
FIG. 5D is a cross-sectional view of an exemplary moisture storage battery according to an aspect of the disclosure.

FIG. 5D is a cross-section of an example of a moisture storage battery according to another aspect of the disclosure and FIG. 5E is a perspective view of the moisture storage battery of 5D. As shown the fan 503d is moving air down through the moisture storage battery 501d. The air enters check valve 502d, flows through the fan into the upper air distribution manifold 504d. Then it is forced through the desiccant bed 506d and heat exchanger portion 505d of the MSB where the moisture content of the air is reduced. Then, air enters the lower air collection manifold 504d and exits through the TEE fitting and check valve 508d at the lower portion of the MSB.

In this example, moisture storage battery 501d includes an open check valve 502d through which a source of air or gas is drawn by fan 503d. The flow of air is passed to air distribution manifolds 504d and pass along an exterior of internal heat exchanger 505d having a desiccant packed bed 506d. Coolant 507d, such as liquid (e.g., water, glycol, etc.) can be passed through the internal heat exchanger 505d. Air can passed out of open check valve 508d. The internal heat exchanger 505d can be separated from the manifolds by screens 509d that can have perforations smaller than a diameter of beads that form desiccant packed bed 506d. The screens 509d can be made from a thermally conductive material and thermally connected to the heat exchanger 505d to optimize heat transfer to a from the passing air flow. The manifolds 504d can also include spacers 510d that define openings for allowing air flow to pass therethrough. In the example of FIGS. 5D-5E, check values 502d and 508d are open (with valves 511d and 512d closed) to allow air to flow from valve 502d (drawn by bidirectional fan 503d), through manifolds 504d, and out of valve 508d during a loading or charging cycle. During a discharge cycle, valves 502d and 508d can be closed and valves 511d and 512d can be open and fan 503d can rotate in an opposite direction to allow air to flow from valve 512d, through manifolds 504d, and out of check valve 511d.

FIG. 5F is an example of a moisture storage battery 501f having motorized or automated valves (that can be controlled by a controller, as described above and below). As shown, moisture storage battery 501f can include a servo motor 502f that can be controlled by a controller (e.g., 302) to switch from charging and/or discharging cycles, for example when relative humidity sensors and/or temperature at inlet and/or outlets meet a predetermined threshold (e.g., indicative of a moisture state of charge). The moisture storage battery 501f can include a three way valve 503f that can be switched by way of servo 502f, a screen 504f for retaining desiccant material in desiccant bed 505f. The heat exchanger coil 506f can have desiccant material packed therein, as in other examples of the present application. The moisture storage battery 501f can also include a fan 507f. In this configuration, the fan 507f can be a one-direction fan since, with active switching valves at each end, the battery could load or unload in the same direction. The active valves can be used to select a connection to the room or to another space like the outdoors without reversing the fan. In another example, a reversible fan allows for the use of the passive check valves without the need for active flow switching elements. An opposing three way valve 508f can be controlled by a second respective motor 502f (e.g., servo motor).

Figure 5G:
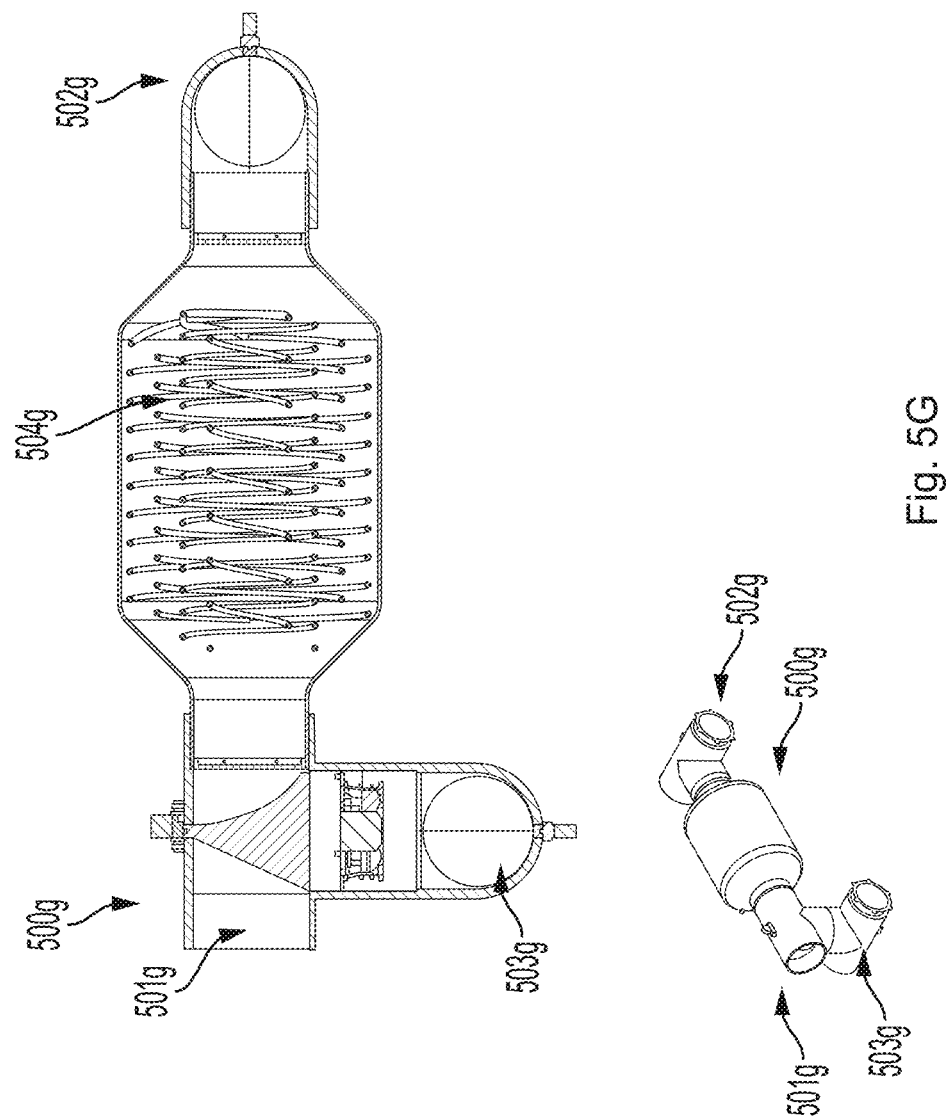
FIG. 5G is a diagram of an exemplary moisture storage battery according to an aspect of the disclosure.

FIG. 5G is an example of a moisture storage battery 500g having a multiple two-way valve arrangement. In this example, a moisture storage battery 501g can have a heat exchanger 504g, single or bi-directional fan, screen, motor, and other components of a moisture storage battery, such as those described in any of the examples above. In FIG. 5G, the valves 501g, 502g, and 503g can be two-way valves, similar to the example of 5F. In this example, a third valve 501g allows a single fan to load or unload the moisture storage battery and also provide direct air ventilation to the room. If valve 501g is set to flow air in from the right the MSB can operates as shown in FIG. 5F. If that valve is set to flow air from bottom to left, then the fan can pull outdoor air and supply it to the room via the valve at the lower left. This configuration provides an additional ventilation option. In this example, the valves 502g and 503g can be rotated relative to one another by 90 degrees relative to the longitudinal axis of the battery 501g.

Figure 6:
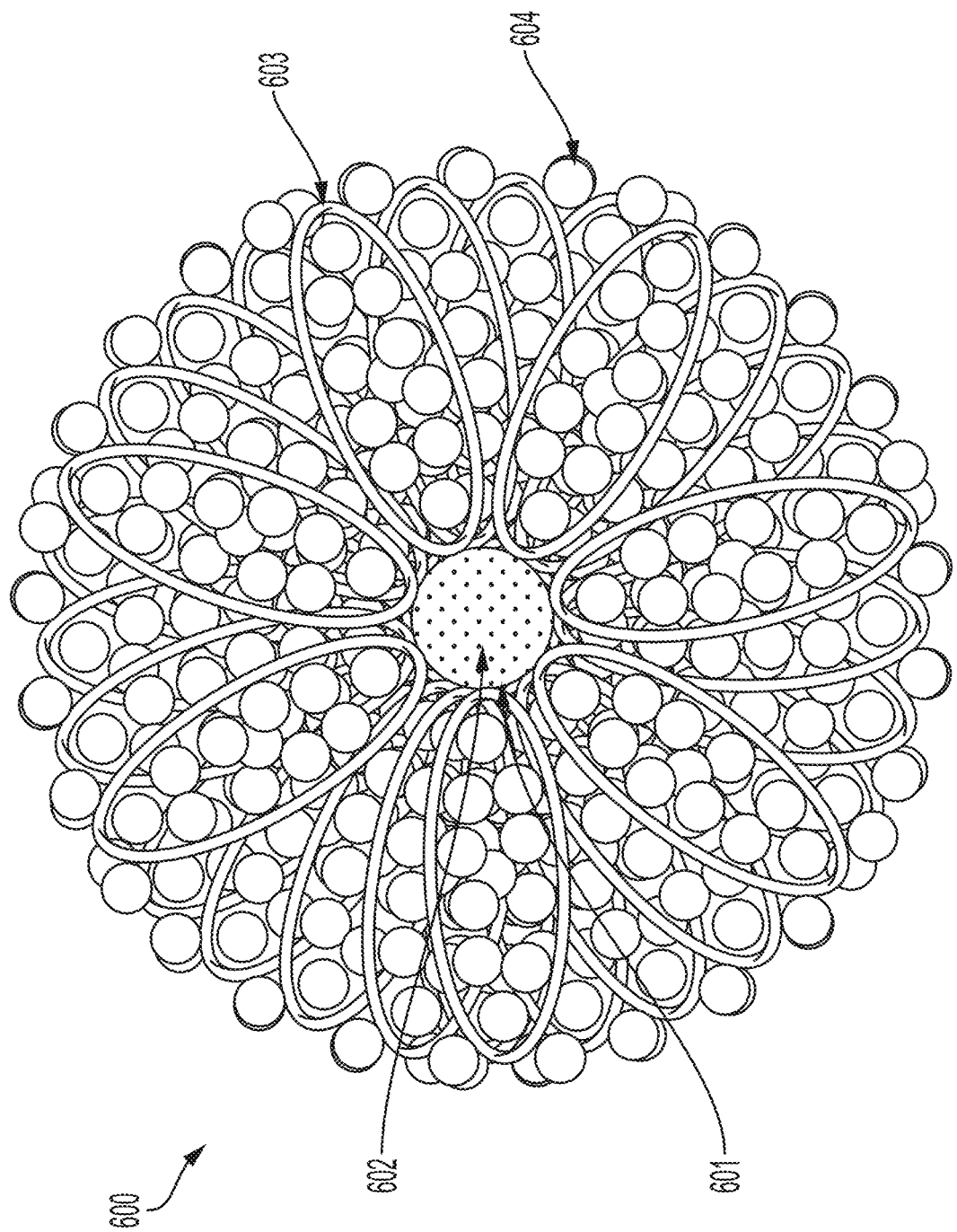
FIG. 6 is a cross section of a heat exchanger optimized to transfer heat and moisture to and from a desiccant material.

Referring to FIG. 6, heat exchanger 600 (e.g., component 503 in FIG. 5) can be a cylindrical or substantially cylindrical pipe 601 through which heat transfer fluid 602 (e.g., water or another fluid) flows. More specifically, FIG. 6 shows a wire-wound heat exchanger in optimal contact with desiccant material. Various tube cross-section geometries of pipe 601 can be employed including circular geometry as show in FIG. 6, while other geometries such as a rectangular, oval, square, or other cross sections are contemplated.

The pipe 601 can include one or more heat exchange surfaces 603. The heat exchange surfaces 603 can include a wire loop(s), grooves, fins, expanded metal, and/or perforated metal which can be semi-permanently or permanently be fixed to the pipe 601 to enhance heat transfer. In the example of FIG. 6, the heat exchange surfaces 603 can include one or more wire loops arranged radially with and fixed with respect to pipe 601 and can be braised or welded with respect to pipe 601. In this regard, heat exchange surfaces 603 generally define a three-dimensional volume such that desiccant media 604 (in this example spherical or substantially spherical beads or pellets having a diameter in the range of 0.1 mm to 10 mm) can be packed at a predetermined density relative thereto. Although not shown in FIG. 6, the heat exchanger 600 can be stored within a housing that defines the volume in which the desiccant media 604 can be stored. In this way, at least some of the desiccant media 604 can be disposed outside (or partially outside) of a strict volume defined by the heat exchange surfaces 603 but still provide a thermal effect.

The diameter and pitch of the heat exchange surfaces 603 (e.g., wire) is such that the packing of desiccant media 604 in the heat exchanger 600 and around heat exchange surfaces 603 is optimized to maximize the packing density of the heat exchanger and desiccant material to ensure optimal heat and moisture transfer. In this way, a packing density can include at least one bead of the desiccant media 604 within a coil of wire, and in one example the packing density can include multiple beads arranged in a radial direction. A selection of the wire diameter relative to the mean bead diameter can provide a system that adds internal heat exchange to a desiccant bed while using only space that was otherwise empty in the bed.

Figure 6A:
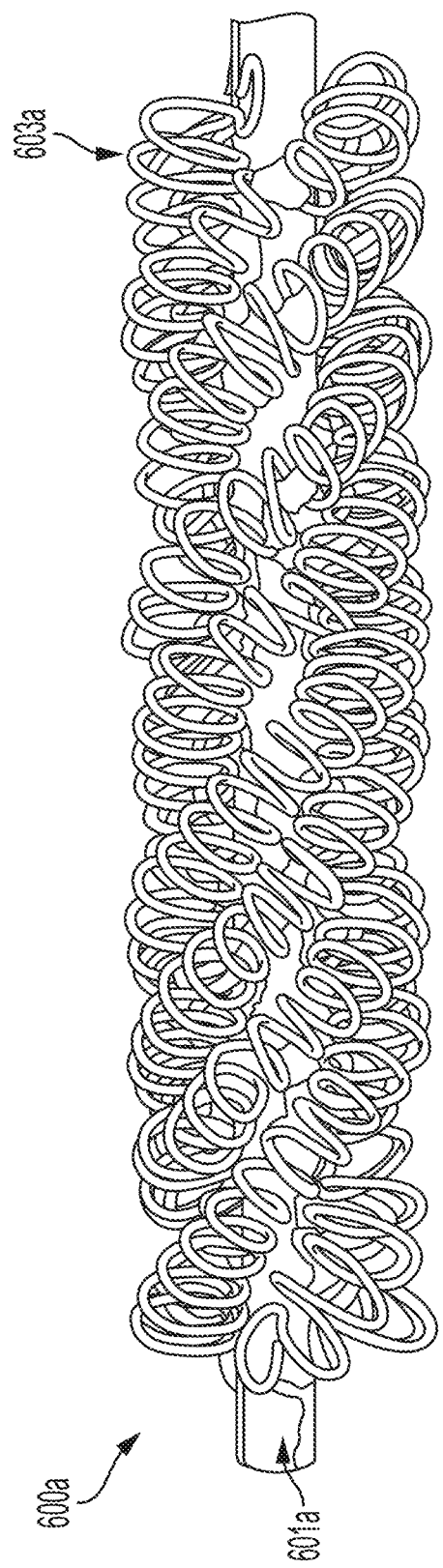
FIG. 6A is a side view of a heat exchanger optimized to transfer heat and moisture to and from a desiccant material.

FIG. 6A is another example of a heat exchanger 600a according to one or more aspects of the disclosure. In this example, the heat exchanger 600a can include a pipe 601a and a plurality of heat exchanger surfaces 603a fixed to the pipe 601a. As shown, the heat exchange surfaces 603a can include a plurality of coils of wire that can each be arranged in helix arrangement relative to the pipe such that the wires are relatively evenly spaced in a longitudinal direction relative to the pipe 601a. Although not depict, the heat exchanger 600a can include a desiccant material (e.g., beads) at a predetermined packing density arranged relative to heat exchanger surface 603a.

Figure 7B:
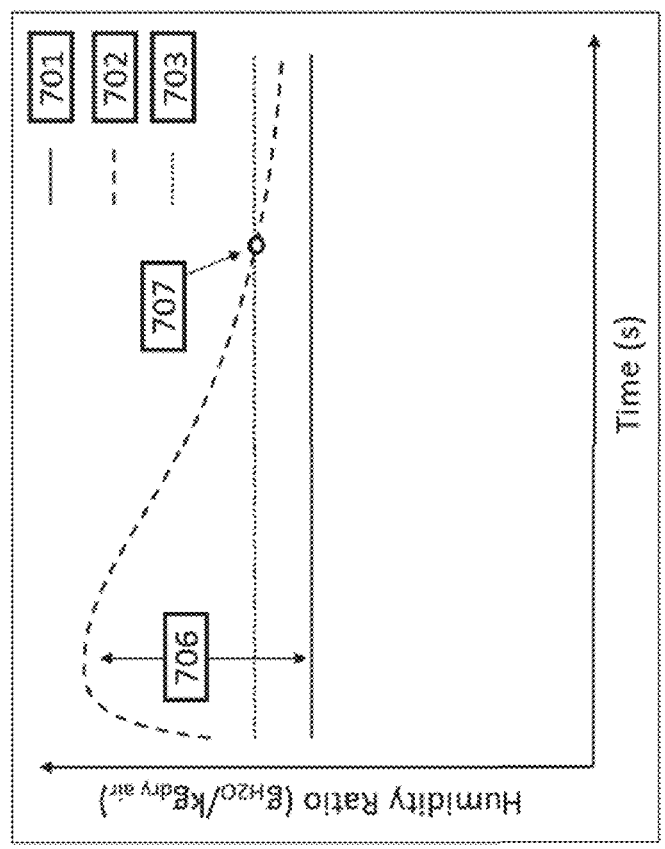
FIG. 7B is a visual illustration of the unloading mode of the Moisture Storage Battery.
Figure 7A:
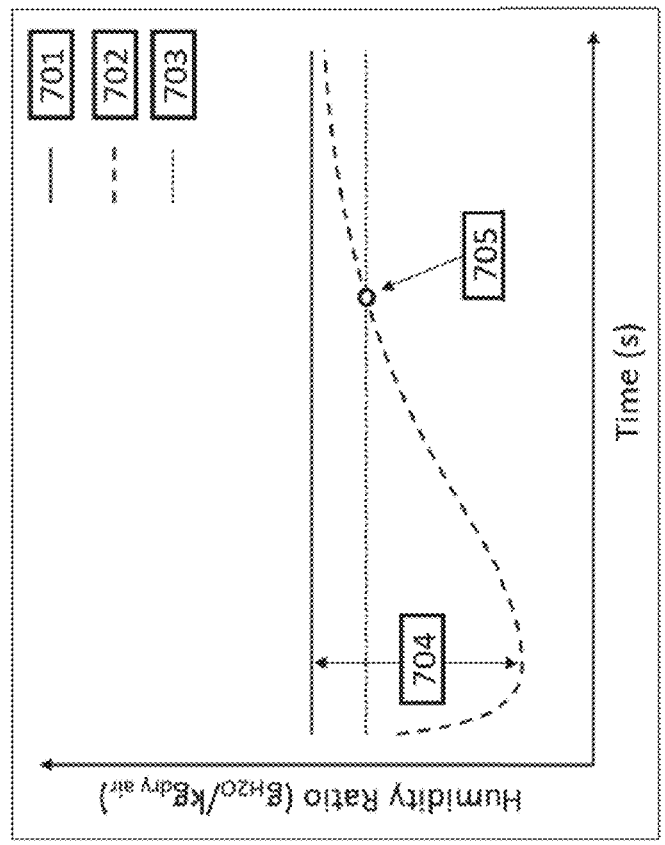
FIG. 7A is a visual illustration of the loading mode of the Moisture Storage Battery.

FIG. 7A is a graph of humidity ratio vs. time of a moisture storage device in loading mode. Inlet air humidity ratio 701 and outlet air humidity ratio 702 are calculated from measured temperature and relative humidity at the inlet and outlet of moisture storage battery 501. The difference between inlet and outlet air humidity ratio 704 decreases over time until threshold relative humidity 703 is reached at time 705, with the threshold value at 705 representing a difference of about 20% of the peak difference 704. FIG. 7B shows the device in unloading mode. Inlet and outlet humidity ratios are calculated as described above, and as before the difference in humidity ratio 706 decreases over time until threshold relative humidity 707 is reached, with the threshold value at 707 representing about a 20% decrease in relative humidity from 706.

Figure 8:
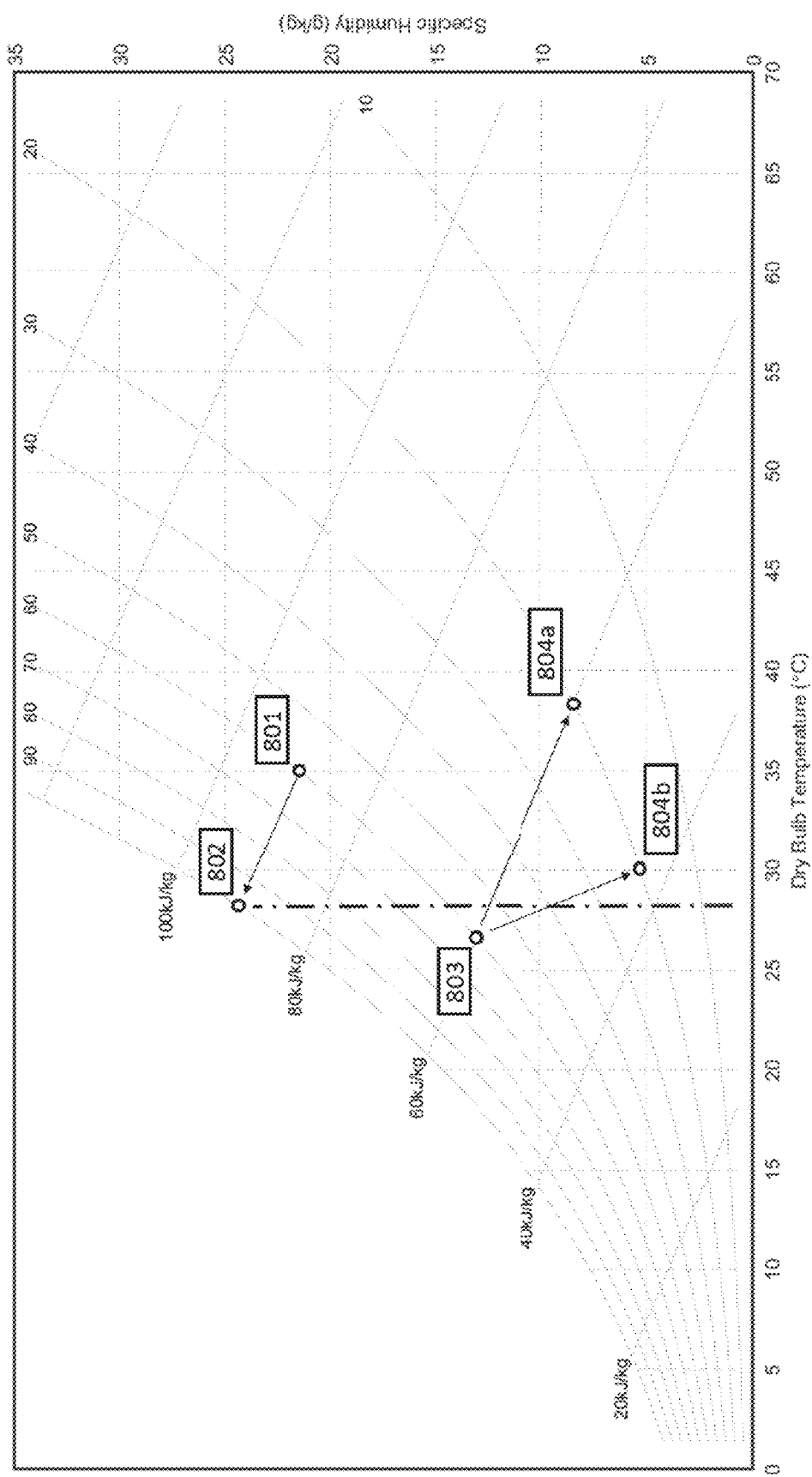
FIG. 8 is a psychrometric chart illustrating the concept of drying and cooling air to the outdoor wet bulb temperature.

In one embodiment, moisture storage battery 501 uses water (or another suitable liquid) cooled via an evaporative process and stored in water tank 403b to absorb the heat of adsorption while loading. FIG. 8 shows the process on the psychrometric chart. Ambient air 801 is cooled by direct evaporation of water to the ambient wet bulb temperature 802. Additional water cooled by this process flows through heat exchanger 503 when moisture storage battery 501 is loading. Room air 803 entering moisture storage battery 501 thereby exits at state 804b, cooler and drier than would be possible in absence of water cooling. State 804a shows the outlet condition if no cooling were supplied.

In other embodiments, the desiccant structure can visually indicate the state of the battery by changing color as it adsorbs and desorbs moisture. Referring to FIG. 9, moisture battery is shown visually to be in Discharged State 901 (in which the desiccant is completely or substantially completely a first color), Charged State 902 (in which the desiccant or substantially completely a second color) or part-way between Charge and Discharge 903 (in which the desiccant is partially a first color and partially a second color). The Moisture State of Charge can be calculated by estimating the color density in an image of a section of the battery. In the example of a partial charge state, the color of the desiccant can change color over time beginning at an upwind portion (relative to air flow) of the battery changes first and gradually changes across the device. FIG. 9 illustrates how the MSB can collects moisture in a moving wave during load and can release it in the same way during an unload cycle.

Figure 10C:
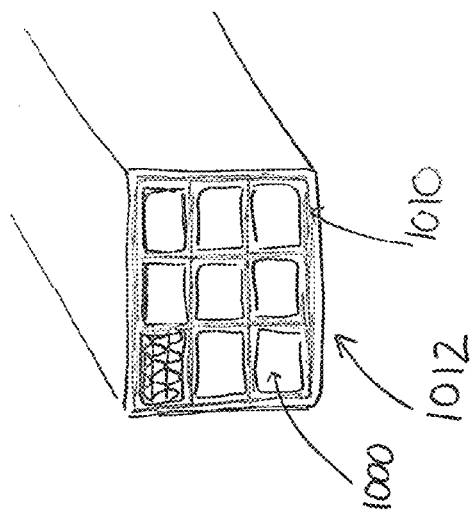
FIG. 10C is a perspective view of an exemplary desiccant cartridge having an arrangement of a plurality of desiccant structures shown in FIG. 10A.
Figure 10B:
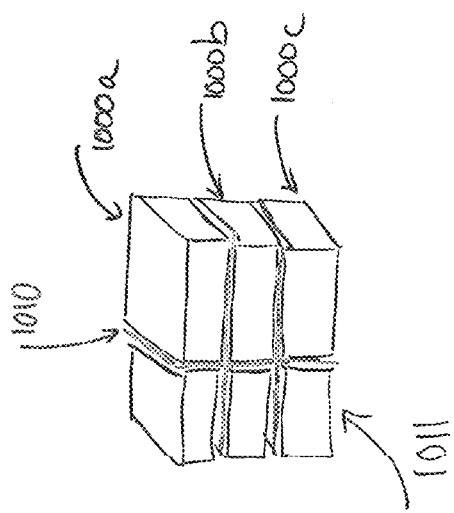
FIG. 10B is a perspective view of an exemplary assembly of plurality of desiccant structures shown in FIG. 10A.
Figure 10A:
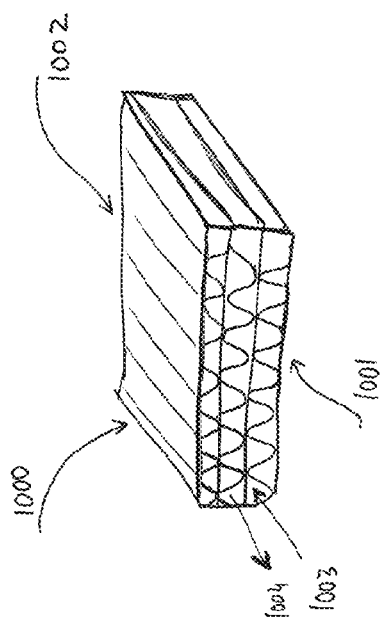
FIG. 10A is perspective view of a desiccant structure for use in the moisture battery according to the embodiments herein.

Referring to FIG. 10A, a desiccant structure 1000 (FIG. 10A) can be 3D printed in multiple layers with two open sides 1001 and 1002 to permit appropriate levels of air to flow. Air may flow in each layer in different directions (arrows 1003 or 1004). Flow direction 1003 may consist of process air that needs to be dried. Flow direction 1004 may consist of heat exchange air or gas that removes heat of adsorption generated by the desiccant. In this manner, both moisture and heat are removed from the process air.

A desiccant assembly 1011 (FIG. 10B) can be formed from multiple desiccant structures (1000a, 1000b, 1000c and so on). Desiccant structures 1000 can be held together with a rigid interstitial material 1010 forming a frame that keeps desiccant structures 1000 in a fixed position. Interstitial material 1010 can be a heat exchanging material that enables heat to flow in and out of the desiccant structures 1000.

Cartridge 1012 can be built using a multitude of desiccant structures 1000 and interstitial material 1010. Cartridges of any size and shapes can be assembled using a multitude of smaller desiccant structures 1000. A cross-section of an exemplary cartridge 1012 is shown in FIG. 10C.

Interstitial material 1010 may also be a phase change material (PCM) which absorb the heat generated by the desiccant material during the adsorption process. In this manner, the desiccant structure 1000 adsorbs moisture while interstitial material 1011 absorbs the heat. The PCM absorbs and stores the heat generated during the moisture adsorption process thereby acting as a thermal storage medium. In the reverse process, when the desiccant material needs to be regenerated, the thermal energy stored by the PCM is released and used to regenerate the desiccant.

Interstitial material 1010 may also be a heat transfer fluid (HTF) which always remains in liquid state such that it can be pumped to a heat exchanger where heat can be added or removed as necessary.

The power system (e.g., system 300 of FIG. 3, or any subsystem of submodule thereof) comprised of modular energy storage sub-systems is controlled by software algorithms executed on standard micro-controller hardware. The control software Executes various algorithms of controlling the air conditioning system using a psychrometric chart to maintain operation within a certain boundary and on a certain path that guarantees lowest energy consumption for the given indoor and outdoor conditions at all times; Displays current and future status using psychrometric chart; Enables or disables the available sub-systems as necessary to optimize energy efficiency, comfort or any other parameter that may be considered useful to its user; Combines multiple distributed A/C units and orchestrates them so that they achieve an optimal cooling performance for one or more dwellings; Enables an external user, such as an electric utility, to turn on/off the system or a sub-system based on a predetermined schedule or an agreement such as a demand-response program; Uses multiple distributed sensors located throughout the dwelling communicating via a wireless protocol; Using this information to map out the heat load that needs to be extracted from each zone; Controls other elements external to the system such as window shading, exhaust fans, ceiling fans, that may affect the overall efficiency of the system; Detects which modules are installed (moisture, water, thermal or energy storage) and adjusts operation accordingly to meet highest efficiency for the given mix of modules; Adjusts water consumption based on seasonal needs and maintains a water consumption target or threshold as set by a user; Adjusts grid electricity consumption and maintains an energy consumption target or threshold as set by a user; Uses the thermal mass and moisture capacity of the condition space as a way to store thermal energy. An example of this implementation would be pre-cooling or pre-drying a room in anticipation of sensible or latent loads.

It should be clear that the above described system effectively and efficiently handles build-up of moisture and/or lack of moisture in an indoor environment in a manner that does not over-tax a cooling or heating system. This system is scalable for differing-size spaces and requirements and can be constructed from relatively straightforward and environmentally benign components.

The foregoing has been a detailed description of illustrative embodiments of the invention. Various modifications and additions can be made without departing from the spirit and scope if this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, as used herein, the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. A method of using a moisture storage device, comprising:
    charging the moisture storage device which is in thermal communication with a heat exchanger until a humidity ratio determined by measuring a relative humidity and a temperature at an outlet increases to meet a first predetermined humidity ratio threshold;
    discharging the moisture device until the humidity ratio at the outlet decreases to meet a second predetermined humidity ratio threshold wherein the heat exchanger is configured to remove a heat of adsorption from the storage device.

2. The method of claim 1, wherein charging the moisture storage device comprises flowing air having a first relative humidity and a first temperature over a desiccant media such that the desiccant media adsorbs moisture.

3. The method of claim 2, wherein discharging the moisture storage device comprises flowing air having a second relative humidity and a second temperature over a desiccant media such that the desiccant media desorbs moisture.

4. A method of using a moisture storage device, comprising:
    a) providing a gas to a moisture storage device, the gas having a first relative humidity and a first temperature;
    b) determining a first humidity ratio of the gas by measuring the first relative humidity and the first temperature;

c) charging the moisture storage device with the gas via an adsorptive process, thereby generating a heat of adsorption;
d) during the charging of c), flowing a liquid at an ambient wet bulb temperature as measured in an ambient atmosphere through a heat exchanger of the moisture storage device;
e) determining a second humidity ratio of the gas by measuring a second relative humidity and a second temperature of the gas while expelling the gas from the moisture storage device, the second humidity ratio being lower than the first humidity ratio.

* * * * *